(12) United States Patent
Son et al.

(10) Patent No.: US 8,817,680 B2
(45) Date of Patent: Aug. 26, 2014

(54) APPARATUS AND METHOD FOR CONTROLLING SLEEP CYCLE SYNCHRONIZATION OF SLEEP MODE IN WIRELESS COMMUNICATION SYSTEM

(75) Inventors: Yeong-Moon Son, Yongin-si (KR);
Taori Rakesh, Suwon-si (KR);
Jae-Jeong Shim, Seongnam-si (KR);
Jung-Je Son, Yongin-si (KR);
Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1097 days.

(21) Appl. No.: 12/754,878

(22) Filed: Apr. 6, 2010

(65) Prior Publication Data

US 2010/0254293 A1    Oct. 7, 2010

(30) Foreign Application Priority Data

Apr. 6, 2009 (KR) .......... 10-2009-0029662
Dec. 30, 2009 (KR) .......... 10-2009-0133738
Jan. 13, 2010 (KR) .......... 10-2010-0003065
Mar. 10, 2010 (KR) .......... 10-2010-0021084
Apr. 6, 2010 (KR) .......... 10-2010-0031318

(51) Int. Cl.
*G08C 17/00* (2006.01)

(52) U.S. Cl.
USPC ............. 370/311; 455/343.2; 455/343.4; 340/7.36

(58) Field of Classification Search
USPC ........... 370/310, 311; 455/130, 334, 343.1, 455/343.2, 343.4; 340/1.1, 6.1, 7.2, 7.32, 340/7.33, 7.36
See application file for complete search history.

(56) References Cited

U.S. PATENT DOCUMENTS

| | | | |
|---|---|---|---|
| 7,924,756 B2 * | 4/2011 | Son et al. ........... | 370/311 |
| 2007/0242786 A1 * | 10/2007 | Kim et al. ........... | 375/354 |
| 2007/0298836 A1 | 12/2007 | Yanover | |
| 2008/0085680 A1 | 4/2008 | Kim et al. | |
| 2010/0002665 A1 * | 1/2010 | Oguchi ........... | 370/338 |
| 2010/0232330 A1 * | 9/2010 | Cheng et al. ........... | 370/311 |
| 2012/0106416 A1 * | 5/2012 | Zheng et al. ........... | 370/311 |

FOREIGN PATENT DOCUMENTS

| | | |
|---|---|---|
| JP | 2007-274728 A | 10/2007 |
| JP | 2010-518765 A | 5/2010 |
| RU | 2345489 C2 | 1/2009 |

(Continued)

OTHER PUBLICATIONS

Kone et al., Proposed Text of Sleep Mode Operation Section for the IEEE 802.16m Amendment, IIEE 802.16 Broadband Wireless Access Working Group, Mar. 2, 2009, ITRI.

(Continued)

*Primary Examiner* — Chi Pham
*Assistant Examiner* — Weibin Huang
(74) *Attorney, Agent, or Firm* — Jefferson IP Law, LLP

(57) ABSTRACT

An apparatus and method for controlling sleep cycle synchronization of a sleep mode in a wireless communication system are provided. A method of operating a Mobile Station (MS) in a sleep mode state includes, if a traffic indication message and unicast data are not received during a listening window, transmitting one of a request message and a header to a Base Station (BS) to request a location of a next-scheduled listening window, and if a response for the one of the request message and the header is received, performing synchronization for a next sleep cycle.

38 Claims, 13 Drawing Sheets

(56) References Cited

FOREIGN PATENT DOCUMENTS

| RU | 2367120 C2 | 9/2009 |
| WO | 2008/060033 A1 | 5/2008 |
| WO | 2008/094017 A2 | 8/2008 |
| WO | 2008/139957 A1 | 11/2008 |

OTHER PUBLICATIONS

LAN/MAN Standards Committee, Draft Standard for Local and Metropolitan Area Networks; Part 16: Air Interface for Broadband Wireless Access Systems, Mar. 18, 2009, IIEE Computer Society, Piscataway, NJ.

* cited by examiner

APPARATUS AND METHOD FOR CONTROLLING SLEEP CYCLE SYNCHRONIZATION OF SLEEP MODE IN WIRELESS COMMUNICATION SYSTEM

PRIORITY

This application claims the benefit under 35 U.S.C. §119 (a) of a Korean patent application filed in the Korean Intellectual Property Office on Apr. 5, 2009 and assigned Serial No. 10-2009-0029662, a Korean patent application filed in the Korean Intellectual Property Office on Dec. 30, 2009 and assigned Serial No. 10-2009-0133738, a Korean patent application filed in the Korean Intellectual Property Office on Jan. 13, 2010 and assigned Serial No. 10-2010-0003065, a Korean patent application filed in the Korean Intellectual Property Office on Mar. 10, 2010 and assigned Serial No. 10-2010-0021084 and a Korean patent application filed in the Korean Intellectual Property Office on Apr. 6, 2010 and assigned Serial No. 10-2010-0031318, the entire disclosures of which are hereby incorporated by reference.

BACKGROUND OF THE INVENTION

1. Field of the Invention

The present invention relates to sleep mode synchronization in a wireless communication system. More particularly, the present invention relates to an apparatus and method for controlling inconsistent state synchronization which occurs when a Mobile Station (MS) in a sleep mode is not able to receive a traffic indication message in a wireless communication system.

2. Description of the Related Art

In a next generation communication system, also known as the 4th Generation (4G) communication system, research is actively in progress to provide users with services having various Quality of Service (QoS) at a high data rate. In particular, research on the 4G communication system is actively in progress to ensure mobility and QoS in a wireless communication system, such as a wireless Local Area Network (LAN) system and a wireless Metropolitan Area Network (MAN) system.

In general, power consumption of a Mobile Station (MS) employed in the wireless communication system is considered a primary performance indicator for overall system performance. Therefore, wireless communication system standards such as the Institute of Electrical and Electronics Engineers (IEEE) 802.16 standard define a sleep mode and an active mode of the MS in order to minimize the power consumption of the MS.

FIG. 1 is a schematic view illustrating a sleep mode operation defined in an IEEE 802.16 system according to the related art.

Referring to FIG. 1A, an MS of the IEEE 802.16e system can transition to a sleep mode only after receiving a state transition grant from a Base Station (BS). In this case, while granting the state transition of the MS to the sleep mode, the BS can buffer or drop a packet to be transmitted. Further, the BS has to report a presence or absence of data to be transmitted to the MS during a listening interval or a listening window of the MS, and the MS has to determine the presence or absence of the data to be transmitted to the MS by waking up from the sleep mode. In FIG. 1, traffic indication messages, i.e., MOBile TRaFfic INDicator (MOB_TRF-IND) messages 100, 102, and 104, are transmitted to report the presence or absence of packet data to be transmitted. The MOB_TRF-IND messages 100 and 102 including 'negative traffic indication' indicate the absence of data, and the MOB_TRF-IND message 104 including 'positive traffic indication' indicates the presence of data.

If the presence of data to be transmitted to the MS is determined during the listening interval or the listening window, the MS transitions to an active mode to receive the data from the BS. Thereafter, the MS transmits and receives SLeeP-REQuest/ReSPonse (SLP-REQ/RSP) messages to and from the BS to transition from the active mode to the sleep mode. As a result, a signaling overhead may occur.

As a measure for preventing the signaling overhead, as illustrated in FIG. 1B, the MS may not transition to the active mode even if traffic exists. There is a restriction that the transition between the active mode and the sleep mode has to be achieved by MOB_SLP-REQ/RSP signaling. Accordingly, when the MS has to receive data, the MS receives the data by transitioning between a sleep state and an active state (or an awake state) in a repetitive manner while operating in the sleep mode according to a sleep cycle.

Referring to FIG. 1B, during a listening interval or a listening window in the sleep state, the MS receives MOB_TRF-IND messages 100, 102, 104, 110, and 112 from the BS. Upon receiving the MOB_TRF-IND message 100 including 'negative traffic indication' during a listening window of an initial sleep cycle, the MS increases a next sleep cycle to double the initial sleep cycle. Thereafter, upon receiving the MOB_TRF-IND message 102 including 'negative traffic indication' after the next sleep cycle elapses, the MS sets the next sleep cycle to double the current sleep cycle. Upon receiving the MOB_TRF-IND message 104 including 'positive traffic indication' after the sleep cycle elapses, the MS receives downlink data during a listening window in which the MOB_TRF-IND message 104 is received, and resets a next sleep cycle to a length of the initial sleep cycle. Thereafter, upon receiving the MOB_TRF-IND message 110 including 'negative traffic indication' during a listening window after elapse of the sleep cycle which is reset to the initial sleep cycle, the MS increases the next sleep cycle to double the initial sleep cycle. Further, upon receiving the MOB_TRF-IND message 112 including 'negative traffic indication' during a listening window after elapse of the increased sleep cycle, the MS increases the next sleep cycle to double the current sleep cycle.

If the MS correctly receives traffic indication information using the MOB_TRF-IND messages transmitted by the BS, sleep cycle synchronization is maintained between the MS and the BS. However, if the MS fails to receive the MOB_TRF-IND messages due to channel state deterioration or the like, the MS cannot know whether the BS transmits 'positive traffic indication' or 'negative traffic indication'. As a result, the MS cannot correctly set a length of a next sleep cycle. Accordingly, sleep cycle synchronization is inconsistent between the MS and the BS.

FIG. 2 illustrates a situation where sleep cycle synchronization is inconsistent in an IEEE 802.16 system according to the related art.

Referring to FIG. 2, an MS correctly receives MOB_TRF-IND messages 200 and 202 including 'negative traffic indication' in a periodic manner during listening windows of sleep cycles, and fails to receive a MOB_TRF-IND message 204 including 'negative traffic indication' during a listening window after a next sleep cycle elapses. In this case, a BS recognizes a listening window of a next sleep cycle as a time t1 212. However, since the MS fails to receive the MOB_TRF-IND message 204, the MS cannot determine whether to reset the next sleep cycle to an initial sleep cycle according to 'positive traffic indication' or to double the next sleep cycle according to 'negative traffic indication'. A listening window start time of an actual sleep cycle is the time t1 212. However, if the MS resets the next sleep cycle to the initial sleep cycle, synchronization for a listening window of the sleep cycle is inconsistent. Accordingly, there is a need for a method of controlling inconsistent sleep cycle synchronization when a MOB_TRF-IND message is not received in a wireless communication system.

SUMMARY OF THE INVENTION

An aspect of the present invention addresses at least the above-mentioned problems and/or disadvantages and to provide at least the advantages described below. Accordingly, an aspect of the present invention is to provide an apparatus and method for controlling inconsistent synchronization caused when a traffic indication message is not received in a wireless communication system.

Another aspect of the present invention is to provide an apparatus and method for controlling inconsistent synchronization according to whether downlink traffic is received upon receiving a traffic indication message in a wireless communication system.

Still another aspect of the present invention is to provide an apparatus and method for controlling inconsistent synchronization by using an additional control message when a traffic indication message is not received in a wireless communication system.

In accordance with an aspect of the present invention, a method of operating a Mobile Station (MS) in a sleep mode state in a broadband wireless communication system is provided. The method includes, if a traffic indication message and unicast data are not received during a listening window, transmitting one of a request message and a header to a Base Station (BS) to request a location of a next-scheduled listening window, and if a response for the one of the request message and the header is received, performing synchronization for a next sleep cycle upon receiving a response for the one of the request message and the header.

In accordance with another aspect of the present invention, a method of operating a BS in a broadband wireless communication system is provided. The method includes receiving one of a request message and a header from an MS, which fails to receive a traffic indication message and unicast data during a listening window, to request a location of a next-scheduled listening window, and unicasting one of a response message and a header including a starting frame number of a next-scheduled sleep cycle and a size of the next-scheduled sleep cycle to the MS in response to the request from the MS.

In accordance with another aspect of the presence invention, a mobile station (MS) apparatus in a broadband wireless communication system is provided. The apparatus includes a modem for transmitting one of a request message and a header to a BS to request a location of a next-scheduled listening window if a traffic indication message and unicast data are not received during a listening window, and a controller for performing synchronization for a next sleep cycle if a response for the one of the request message and the header is received.

In accordance with still another aspect of the present invention, a Base Station (BS) apparatus in a broadband wireless communication system is provided. The apparatus includes a modem for receiving one of a request message and a header from an MS, which fails to receive a traffic indication message and unicast data during a listening window, the request message requesting a location of a next-scheduled listening window, and a controller for responding to the MS by unicasting one of a response message and a header including a starting frame number of a next-scheduled sleep cycle and a size of the next-scheduled sleep cycle to the MS.

In accordance with yet another aspect of the present invention, a method of operating a Mobile Station (MS) of a wireless communication system in a sleep mode is provided. The method includes operating the MS in a sleep mode for a predetermined period of time, exiting the sleep mode and listening for a traffic indication message from a Base Station (BS), if the traffic indication is received, determining whether the traffic indication message comprises one of a 'positive traffic indication' and a 'negative traffic indication, and when the traffic indication message comprises a 'negative traffic indication', doubling the predetermined period of time, and when the traffic indication message comprises a 'positive traffic indication', resetting the predetermined period of time to an initial period of time, and if the traffic indication message is not received, determining whether downlink traffic is present while listening for the traffic indication message, and if the downlink traffic is present, resetting the predetermined period of time to the initial period of time.

In accordance with still another aspect of the present invention, a method of operating a Base Station (BS) to control a sleep cycle of a Mobile Station (MS) in a wireless communication system is provided. The method includes determining whether the MS is listening for a traffic information message, generating a traffic information message based on the presence of downlink information to be transmitted to the MS, transmitting the traffic indication message to the MS, and when a sleep control signaling request message is received from the MS, determining information for sleep mode synchronization and transmitting a sleep control signaling response message including the information for sleep mode synchronization to the MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figures 1A, 1B:
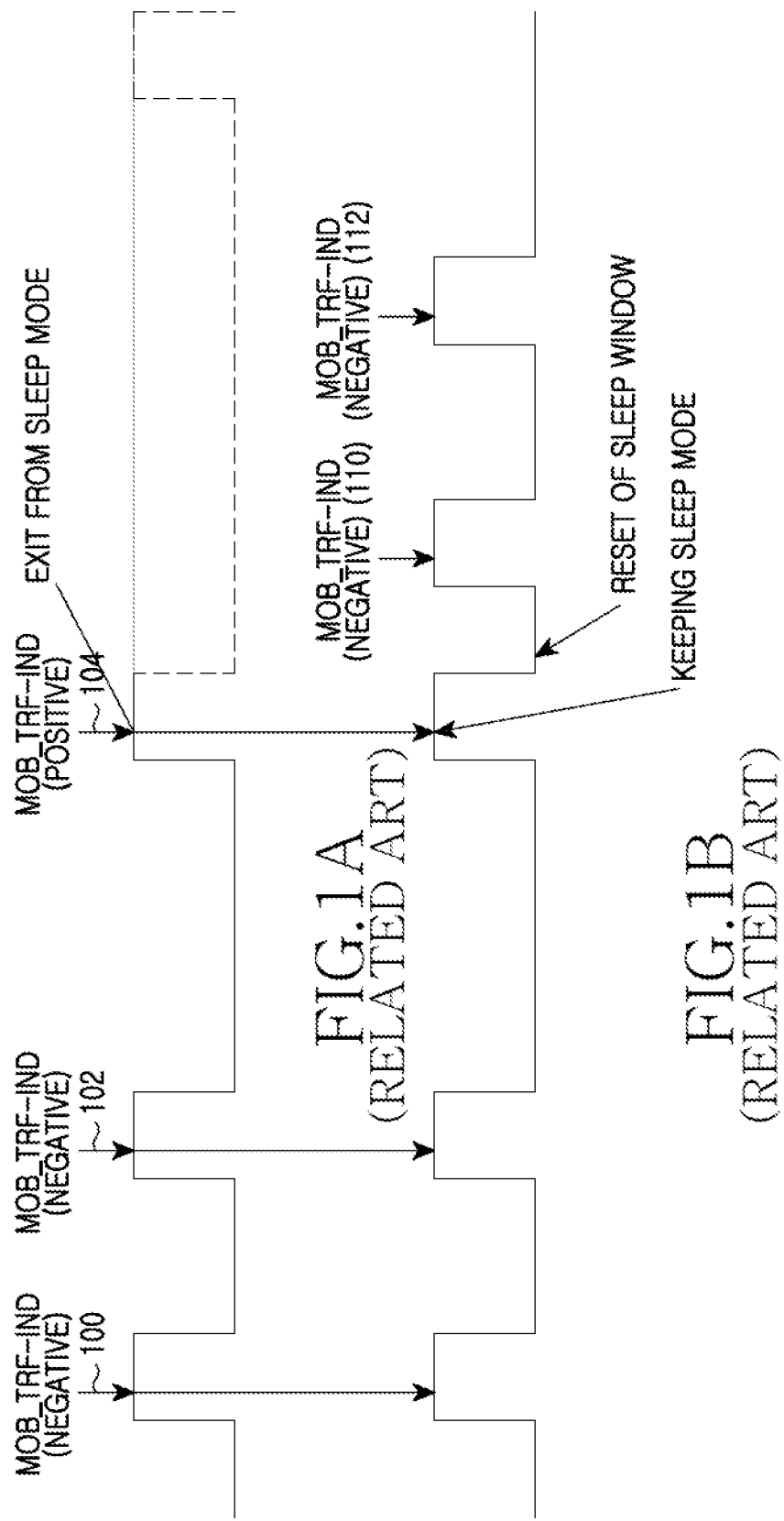
FIG. 1 is a schematic view illustrating a sleep mode operation defined in an Institute of Electrical and Electronics Engineers (IEEE) 802.16 system according to the related art.
Figure 2:
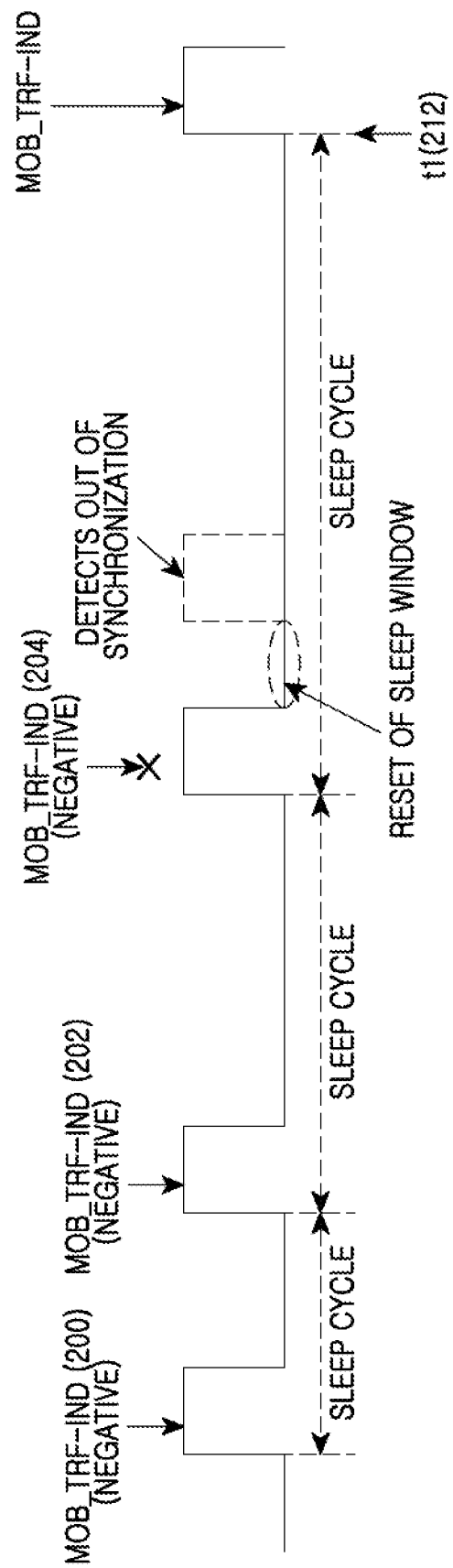
FIG. 2 illustrates a situation where sleep cycle synchronization is inconsistent in an IEEE 802.16 system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, a technique for controlling sleep cycle synchronization of a sleep mode will be described when a Mobile Station (MS) does not receive a traffic indication message, i.e., a MOBile TRaFfic INDicator (MOB_TRF-IND) message, in a wireless communication system. Although exemplary embodiments of the present invention as described herein employ a process of controlling a sleep mode operation with respect to the Institute of Electrical and Electronics Engineers (IEEE) 802.16m communication system, a sleep mode state synchronization control method according to exemplary embodiments of the present invention can also apply not only to the IEEE 802.16m communication system but also to other communication systems. In addition, although exemplary embodiments of the present invention as described herein involve an operation for controlling a sleep mode operation by one MS and one Base Station (BS) in the wireless communication system, the sleep mode operation control method according to exemplary embodiments of the present invention can also apply to a case where a plurality of MSs are present.

A sleep cycle changes depending on a value of a MOB_TRF-IND message in a system according to an exemplary embodiment of the present invention. The MOB_TRF-IND message is used to report to the MS a presence of downlink data traffic. If the MOB_TRF-IND message includes 'positive traffic indication', a next sleep cycle is reset to an initial sleep cycle. On the other hand, if the MOB_TRF-IND message includes 'negative traffic indication', the next sleep cycle is increased to double an immediately previous sleep cycle. When the MS transmits data traffic or bandwidth request, the sleep cycle is also reset to the initial sleep cycle as in the case where the MOB_TRF-IND message includes 'positive traffic indication'. When the next sleep cycle is reset, the next sleep cycle may be reset to a pre-defined length other than the initial sleep cycle. For example, the pre-defined length may be a length corresponding to an integer multiple of the initial sleep cycle.

Figure 3:
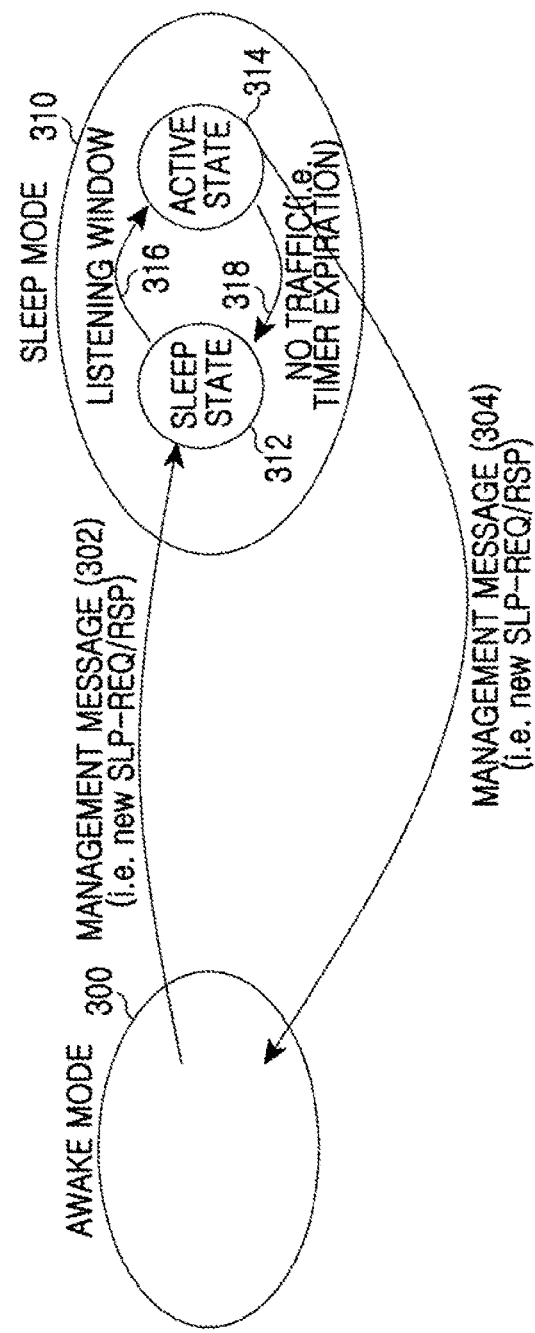
FIG. 3 illustrates a state transition diagram between a sleep mode and an active mode in a wireless communication system according to an exemplary embodiment of the present invention.

FIG. 3 illustrates a state transition diagram between a sleep mode and an active mode in a wireless communication system according to an exemplary embodiment of the present invention.

Referring to FIG. 3, a mode transition (or mode change) phase of a BS and an MS is illustrated. A state of the MS includes an active mode 300 and a sleep mode 310. The active mode 300 is a state in which traffic is frequently generated. In this state, packet data can be always transmitted/received between the BS and the MS. On the other hand, the sleep mode 310 is a state in which almost no traffic is generated. In this state, data packets are transmitted/received between the BS and the MS only in a negotiated time interval. Power consumption of the MS in the active mode 300 is greater than power consumption of the MS in the sleep mode 310. Therefore, if traffic to be transmitted/received by the MS to/from the BS is not generated frequently, the MS can minimize power consumption by transitioning to the sleep mode 310.

In order for the MS to transition from the active mode 300 to the sleep mode 310, the MS should receive a state transition grant from the BS. In addition, the BS should buffer or drop packet data to be transmitted while allowing the MS to achieve a state transition to the sleep mode 310. For example, when a state transition 302 is achieved from the active mode 300 to the sleep mode 310 or when a state transition 304 is achieved from the sleep mode 310 to the active mode 300, the MS and the BS should transmit and receive a SLeeP_REQuest/ReSPonse (SLP_REQ/RSP) message. For the state transition 302 or 304, the MS and the BS should always exchange the SLP_REQ/RSP message, which may result in the increase of a signaling overhead.

To remove the signaling overhead, the wireless communication system according to exemplary embodiments of the present invention defines a sleep state 312 and an active state 314 in the sleep mode 310. A transition between the active mode 300 and the sleep mode 310 is achieved only by transmission and reception of the MOB_SLP-REQ/RSP message. The sleep state 312 and the active state 314 are repeated in the sleep mode 310. The active mode 300 and the active state 314 of the sleep mode 310 are a state in which traffic is generated. In this state, packet data is transmitted/received between the BS and the MS. In this case, a transition from the active state 314 to the sleep state 312 in the sleep mode 310 is achieved by timer expiration. The wireless communication system according to an exemplary embodiment of the present invention defines a sleep cycle in the sleep mode 310, and allows a transition between the sleep state 312 having no traffic transmission and the active state 314 having traffic transmission in the sleep mode 310. The sleep cycle includes a listening window 316 and a sleep window 318.

The sleep window 318 is an interval that is requested by the MS when a transition is made from the active mode 300 to the sleep mode 310 and that can be allocated by the BS at the request of the MS. The sleep window 318 also denotes a time interval until the MS transitions back to the active state 314 after transitioning to the sleep state 312, and consequently, is defined as a time in which the MS remains in the sleep state 312. The listening window 316 is an interval that is requested by the MS together with the sleep window when a transition is made from the active mode 300 to the sleep mode 310 and that can be allocated by the BS at the request of the MS. The listening window 316 denotes a time interval until the MS can decode downlink messages (e.g., a TRF_IND message) in synchronization with the BS after being released from the sleep state 312. The MOB_TRF-IND message is a message indicating a presence or absence of traffic (i.e., packet data) to be transmitted to the MS. The MS determines whether to remain in the active state 314 or to transition back to the sleep state 312 according to the value of the MOB_TRF-IND message.

When the MS transitions from the active state 314 to the sleep state 312, the MS determines a sleep window size using a pre-set minimum window value as an initial sleep state period. Thereafter, the MS wakes up from the sleep state 312 during the listening window and determines that there is no packet data to be transmitted from the BS. The MS then sets the sleep window to double an immediately previous sleep window and maintains the sleep state 312. For example, if a value of the initial sleep window is '2', the MS sets the sleep window to a length of 2 frames, and operates in the sleep state 312 during an interval of the 2 frames. After the 2 frames, the MS is released from the sleep state 312, and determines whether the MOB_TRF-IND message is received. If the MOB_TRF-IND message includes 'negative traffic indication' for the MS, that is, if no packet data is transmitted from the BS to the MS, the MS sets the sleep window to a length of 4 frames, i.e., double the length of 2 frames, and then operates in the sleep state 312 during the interval of 4 frames.

Figure 4:
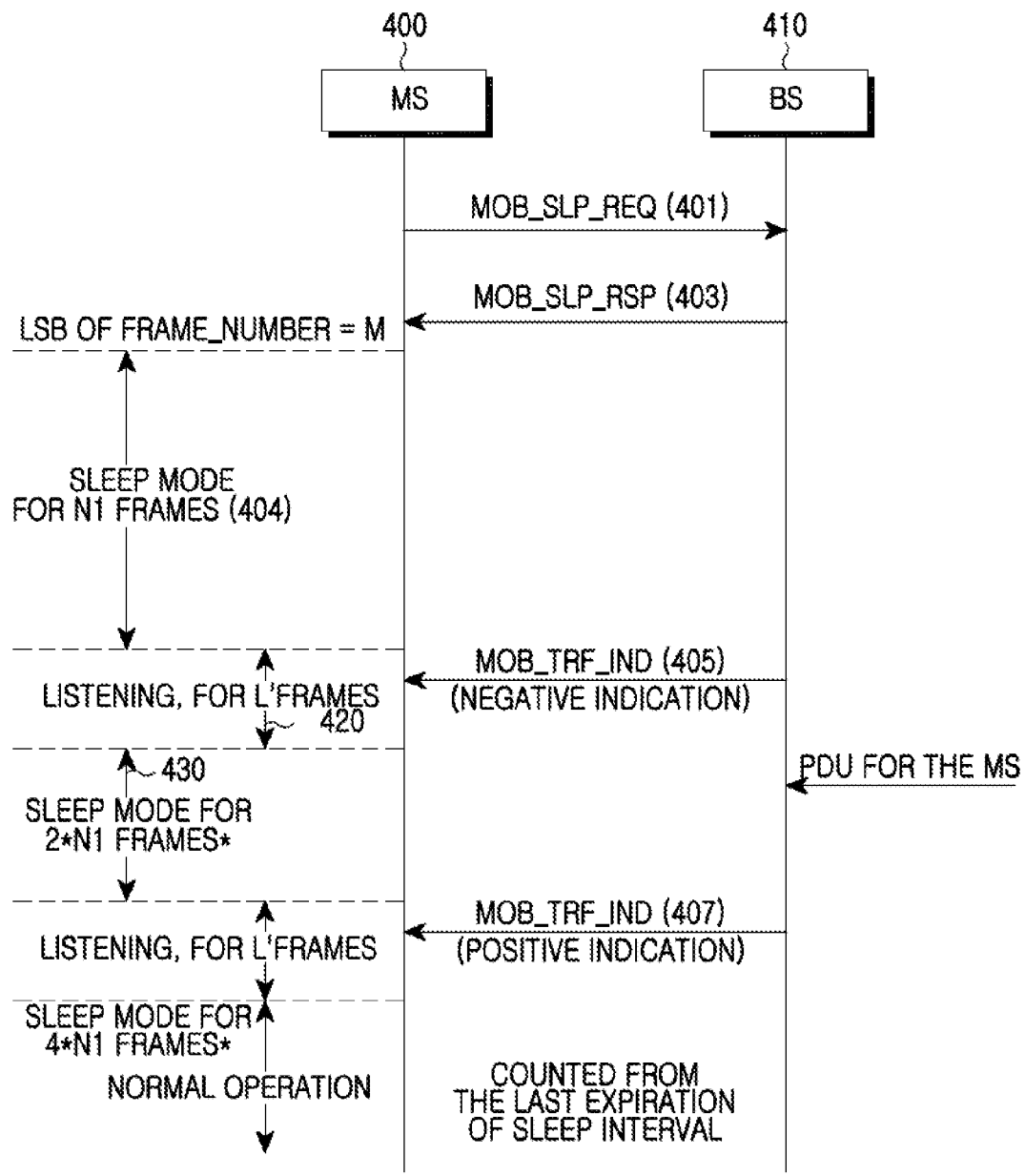
FIG. 4 illustrates an operation for a sleep mode in a wireless communication system according to an exemplary embodiment of the present invention.

FIG. 4 illustrates an operation for a sleep mode in a wireless communication system according to an exemplary embodiment of the present invention.

Referring to FIG. 4, an MS 400 transmits a MOBile SLeeP REQuest (MOB_SLP-REQ) message to a BS 410 to transition to the sleep mode 310 while operating in the active mode 300 in step 401. Upon receiving the MOB_SLP-REQ message, the BS 410 determines whether to allow the MS 400 to transition to the sleep mode 310 based on a condition of the BS 410 and the MS 400. According to the determination result, the BS 410 transmits a MOBile SLeeP ReSPonse (MOB_SLP-RSP) message to the MS 400 in step 403. The MOB_SLP-RSP message includes a listening window parameter indicating a listening window. According to another exemplary embodiment of the present invention, unlike in FIG. 4, the BS 410 may instruct the MS 400 to transition to the sleep mode without the request of the MS 400 in an unsolicited manner, rather than the BS 410 responding to the MOB_SLP-REQ of the MS 400. By receiving the MOB_SLP-RSP message without the reception of the MOB_SLP-REQ message from the MS 400, the BS 410 instructs the MS 400 to transition to the sleep mode.

Upon receiving the MOB_SLP-REQ message from the BS 410, the MS 400 starts a sleep mode operation according to the MOB_SLP-REQ message in step 404. In this case, the MS 400 recognizes that the sleep mode operation will be performed according to the listening window parameter included in the MOB_SLP-REQ message. Further, the MS 400 can transition from the sleep mode to the active mode in step 420 when there is data to be transmitted to the BS 410. If there is no data to be transmitted to the MS 400, then in step 405 the BS 410 transmits a MOB_TRF-IND message not including an identifier of the MS 400 in the listening window of the sleep mode. The MOB_TRF-IND message is not in association with the MS 400, and thus the MOB_TRF-IND message for the MS 400 includes 'negative traffic indication'. The MS 400 decodes the MOB_TRF-IND message. Thereafter, the MS 400 recognizes that the message does not include the identifier of the MS 400, and then maintains the sleep mode in step 430. In this case, the sleep window is doubled according to a sleep window update algorithm.

If the BS 410 has data to be transmitted to the MS 400, that is, if data is provided to the MS 400 from a network, the BS 410 transmits the MOB_TRF-IND message including the identifier of the MS 400 in step 407. The MOB_TRF-IND message for the MS 400 includes 'positive traffic indication'. The MS 400 decodes the MOB_TRF-IND message. Thereafter, the MS 400 recognizes that the message includes the identifier of the MS 400, and then transitions to the active mode to receive data from the BS 410.

Hereinafter, a process of controlling synchronization between a BS and an MS for a sleep state and an active state will be described when the MS fails to receive a MOB_TRF-IND message in a process in which the sleep state and the active state in a sleep mode are repeated according to a sleep cycle.

Figure 5:
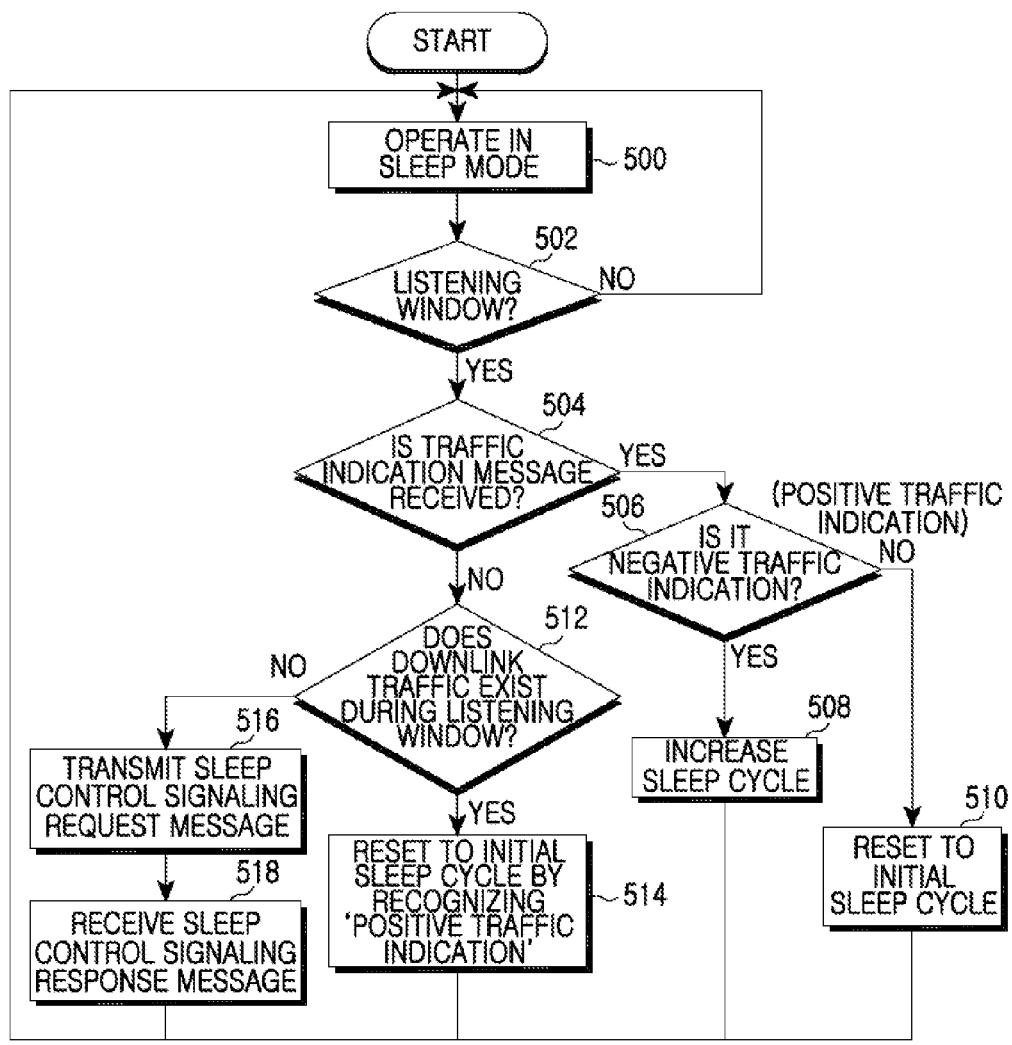
FIG. 5 is a flowchart illustrating an operation of a Mobile Station (MS) for controlling sleep cycle synchronization of a sleep mode in a wireless communication system according to an exemplary embodiment of the present invention.

FIG. 5 is a flowchart illustrating an operation of an MS for controlling sleep cycle synchronization of a sleep mode in a wireless communication system according to an exemplary embodiment of the present invention.

Referring to FIG. 5, the MS operates in the sleep mode in step 500. While operating in the sleep mode, the MS determines whether a listening window starts according to a sleep cycle in step 502. If it is determined that the listening window does not start, the MS maintains the sleep mode and returns to step 500.

When it is determined that the listening window starts, the MS waits to receive a MOB_TRF-IND message during the listening window in step 504. The MOB_TRF-IND message indicates whether downlink traffic of the MS exists by using a presence or absence of an identifier of the MS.

Upon receiving the MOB_TRF-IND message, the MS determines in step 506 whether the MOB_TRF-IND message indicates 'negative traffic indication' or 'positive traffic indication'. Whether the MOB_TRF-IND message indicates 'negative traffic indication' or 'positive traffic indication' is determined by whether the MOB_TRF-IND message includes identifier information of the MS. If it is determined that the identifier information is included, the MOB_TRF-IND message indicates 'positive traffic indication'. If it is determined that the identifier information is not included, the MOB_TRF-IND message indicates 'negative traffic indication'.

If the MOB_TRF-IND message indicates 'negative traffic indication', then in step 508, the MS increases the next sleep cycle to double the current sleep cycle. For example, if the length of the current sleep cycle is 4 frames, the length of the next sleep cycle is 8 frames. The BS sets the next sleep cycle to double the current sleep cycle while including 'negative traffic indication' in the MOB_TRF-IND message, and as a result, the MS recognizes 'negative traffic indication' and sets the next sleep cycle to double the current sleep cycle. Accordingly, the MS and the BS implicitly synchronize the sleep cycle.

If the MOB_TRF-IND message indicates 'positive traffic indication', then in step 510, the MS resets the next sleep cycle to a length of an initial sleep cycle. The BS sets the next sleep cycle of the MS to the initial sleep cycle while including 'positive traffic indication' in the MOB_TRF-IND message, and as a result, the MS recognizes 'positive traffic indication' and sets the next sleep cycle to the initial sleep cycle. Accordingly, the MS and the BS implicitly synchronize the sleep cycle.

If it is determined that the MOB_TRF-IND message is not received in step 504, then in step 512, the MS determines whether downlink traffic is received during a remaining listening window. Since the MOB_TRF-IND message is not received in this case, the MS cannot determine whether to double the length of the next sleep cycle or to reset the length of the next sleep cycle to the length of the initial sleep cycle. Therefore, in this case, the BS and the MS may operate according to different sleep cycles.

Even if the MS cannot receive the MOB_TRF-IND message, the MS can infer whether the MOB_TRF-IND message not received during the listening window indicates 'positive traffic indication' or 'negative traffic indication' by determining whether downlink traffic is received during the remaining listening window in step 506. If the downlink traffic is received during the remaining listening window, then a presence of the downlink traffic is reported by 'positive traffic indication' included in the MOB_TRF-IND message. If the downlink traffic is not received during the remaining listening window, then an absence of the downlink traffic is reported by 'negative traffic indication' included in the MOB_TRF-IND message.

If it is determined that the downlink traffic is received during the remaining listening window, the MS recognizes that the MOB_TRF-IND message not received during the listening window indicates 'positive traffic indication', and resets the length of the next sleep cycle to the length of the initial sleep cycle in step 514. If it is determined that the downlink traffic is not received during the remaining listening window, the MS transmits a sleep control signaling request message in step 516 to report to the BS that the MOB_TRF-IND message was not received during the listening window in step 504.

If the downlink traffic is not received, this is a case where the downlink traffic is not transmitted, that is, the not-received MOB_TRF-IND message indicates 'negative traffic indication', or a case where the downlink traffic is not received due to deterioration of a channel state even though the downlink traffic is transmitted. If the downlink traffic is not transmitted as in the former case, the MS may set the next sleep cycle to double the current sleep cycle. In this case, the MS does not have to transmit the sleep control signaling request message. However, in a case where the transmitted downlink traffic is not received due to deterioration of the channel state as in the latter case, if the MS determines that the MOB_TRF-IND message indicates 'negative traffic indication' and thus sets the next sleep cycle to double the current sleep cycle, the sleep cycle becomes inconsistent between the MS and the BS.

To avoid the inconsistent sleep cycle occurring in the latter case, the MS transmits the sleep control signaling request message to the BS, and thus eliminates an uncertain condition where it cannot be determined whether the non-received MOB_TRF-IND message indicates 'positive traffic indication' or 'negative traffic indication'. According to another exemplary embodiment of the present invention, instead of determining whether the MOB_TRF-IND message indicates 'positive traffic indication' or 'negative traffic indication', the MS may request a start time of the next sleep cycle to match start times of uncertain sleep cycles. For example, the sleep control signaling request message may be configured as shown in Table 1 below.

TABLE 1

| Syntax | Size (bit) | Notes |
|---|---|---|
| Sleep Control Signaling Header format( ) { | | |
|     Management Message Type = XX | 8 | |
|     MSID | 8 | MS ID |
|     Request_Type | 8 | 0x00: Sleep Sync Info Request |
| | | 0x01: Exit Sleep Mode |
|     If (Request_Type == 0x00) { | | |
|         Frame_Number | | Least Significant 4 bits of Frame number |
|     } | | |
| } | | |

'MSID' denotes an identifier of the MS. 'Request_Type' denotes a request type indicating whether a request is a request for sleep mode synchronization or a request for a transition from the sleep mode to the active mode. For example, if 'Request_Type' is '0x00', this implies requesting the provision of information for solving an inconsistent synchronization problem while reporting occurrence of the inconsistent synchronization caused by non-reception of the MOB_TRF-IND message. If 'Request_Type' is '0x01', this implies that the MS intends to release the sleep mode. If 'Request_Type' is '0x00', 'Frame Number' represents the 4 Least Significant Bits (LSB) of a frame corresponding to a listening window in which the MOB_TRF-IND message has to be received. However, according to another exemplary embodiment of the present invention, 'Frame Number' may represent LSB 4 bits of a superframe including the listening window. According to 'Exit Sleep Mode', the sleep control signaling request message may be used for purposes other than addressing the problem of inconsistent sleep mode synchronization. Therefore, if the sleep control signaling request message is used only to address the problem of inconsistent sleep mode synchronization, 'Request_Type' information may be omitted.

In step 518, the MS receives a sleep control signaling response message as a response for the sleep control signaling request message. Accordingly, the MS can know whether the MOB_TRF-IND message that was not received in step 504 indicated 'positive traffic indication' or 'negative traffic indication'. According to another exemplary embodiment of the present invention, the MS can know a start time of a next sleep cycle using the sleep control signaling response message.

In the exemplary embodiment described with reference to FIG. 5, the MS doubles a sleep cycle upon receiving 'negative traffic indication', and resets the sleep cycle to a length of the initial sleep cycle upon receiving 'positive traffic indication'. Details of regulating a length of the sleep cycle based on a type of the traffic indication are determined according to a result of negotiation using MOB_SLP-REQ/RSP signaling performed by the MS with the BS to enter the sleep mode. Therefore, the negotiation in which the sleep cycle is doubled upon receiving 'negative traffic indication' and the sleep cycle is reset to the length of the initial sleep cycle upon receiving 'positive traffic indication' is premised in the embodiment of FIG. 5.

Another negotiation is also possible according to another exemplary embodiment of the present invention. For example, the negotiation may be achieved under the premise that the sleep cycle is doubled upon receiving 'negative traffic indication' and the sleep cycle is also doubled upon receiving 'positive traffic indication'. In this case, the MS doubles the sleep cycle in step 514.

Figure 6:
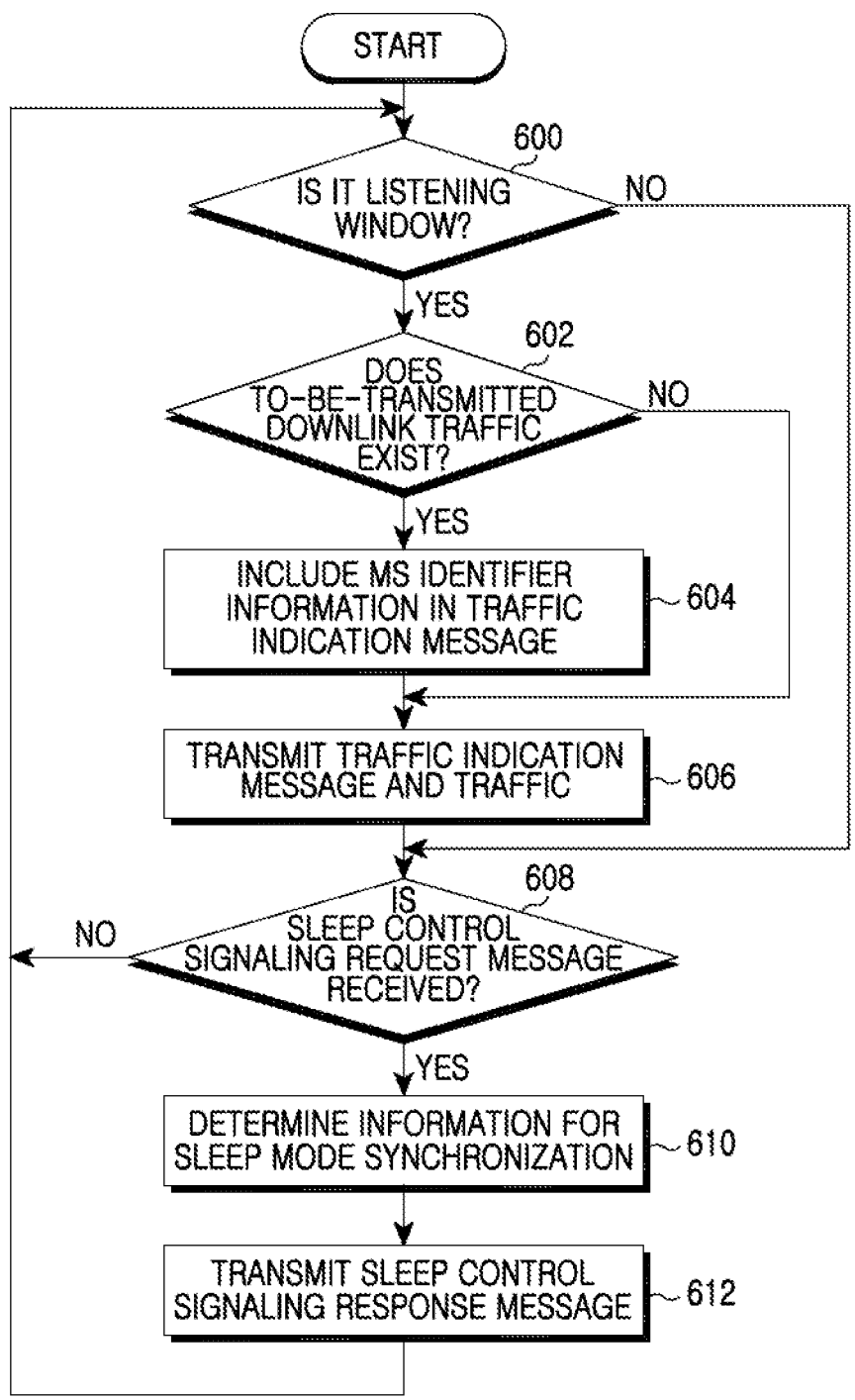
FIG. 6 is a flowchart illustrating an operation of a Base Station (BS) for controlling sleep cycle synchronization of a sleep mode in a wireless communication system according to an exemplary embodiment of the present invention.

FIG. 6 is a flowchart illustrating an operation of a BS for controlling sleep cycle synchronization of a sleep mode in a wireless communication system according to an exemplary embodiment of the present invention.

Referring to FIG. 6, in step 600, the BS determines whether a listening window of an MS has started. If it is determined that the listening window has started, the BS determines whether downlink traffic is to be transmitted to the MS in step 602.

If it is determined that downlink traffic is to be transmitted to the MS, then the BS includes identifier information of the MS in a MOB_TRF-IND message in step 604. By including the identifier information of the MS in the MOB_TRF-IND message, the MOB_TRF-IND message is recognized by the MS as 'positive traffic indication'. Otherwise, if it is determined that there is no downlink traffic to be transmitted to the MS, step 604 is skipped. Therefore, according to whether the identifier information of the MS is included in the MOB_TRF-IND message, the MS determines whether the MOB_TRF-IND message indicates 'negative traffic indication' or 'positive traffic indication'.

In step 606, the BS transmits the MOB_TRF-IND message including identifier information of at least one MS and the downlink traffic of the MS. Transmission of the downlink traffic of the MS may be skipped according to the determination result of step 602.

In step 608, the BS determines whether a sleep control signaling request message is received from the MS. The sleep control signaling request message requests information for sleep mode synchronization, and may be configured, for example, as shown in Table 1 above.

Upon receiving the sleep control signaling request message, the BS determines information for sleep mode synchronization in step 610. The information of sleep mode synchronization is traffic indication information indicated by the MOB_TRF-IND message not received by the MS, i.e., 'negative traffic indication' or 'positive traffic indication'. According to another exemplary embodiment of the present invention, the information for sleep mode synchronization may be start time information of a next sleep cycle.

After determining the information for sleep mode synchronization, the BS transmits to the MS a sleep control signaling response message including the information of sleep mode synchronization in step 612. For example, the sleep control signaling response message may be configured as shown in Table 2 below.

TABLE 2

| Syntax | Size (bit) | Notes |
|---|---|---|
| Sleep Control Signaling Response format( ) { | | |
|     Management Message Type = XX | 8 | |
|     MSID | 8 | |
|     Request_Type | 8 | 0x00: Sleep Sync Info Request<br>0x01: Exit Sleep Mode |
|     If(Request_Type == 0x00) { | | |
|         Traffic Indication | 1 | 0: Negative Traffic Indication<br>1: Positive Traffic Indication |
|         Frame_Number | | |
|     }else if(Request_Type == 0x01) { | | |
|         Approval Code | 1 | 0: Reject MS's sleep mode exit<br>1: Approved MS's sleep mode exit |
|     } | | |
| } | | |

If 'Request Type' is '0x00', 'Frame Number' represents LSB 4 bits of a frame corresponding to a listening window in which the MS has to receive the MOB_TRF-IND message. However, according to another exemplary embodiment of the present invention, 'Frame Number' may represent LSB 4 bits of a superframe including the listening window. According to another exemplary embodiment of the present invention, 'Frame Number' may be omitted. 'Traffic Indication' denotes traffic indication information of the MOB_TRF-IND message transmitted at a time indicated by 'Frame Number'. If 'Request Type' is '0x01', 'Approval Code' is included to indicate approval/rejection of the BS as to 'Exit Sleep Mode' of the MS.

According to another exemplary embodiment of the present invention, the sleep control signaling response message may be configured as shown in Table 3 below.

TABLE 3

| Syntax | Size (bit) | Notes |
|---|---|---|
| Sleep Control Signaling Response format( ) | | |
| { | | |
|     Management Message Type = XX | 8 | |
|     MSID | 8 | |
|     Request_Type | 8 | 0x00: Sleep Sync Info Request<br>0x01: Exit Sleep Mode |
|     If(Request_Type == 0x00) { | | |
|         Frame_Number for Next Scheduled Listening Window | 10 | |
|     }else if(Request_Type == 0x01) { | | |
|         Approval Code | 1 | 0: Reject MS's sleep mode exit<br>1: Approved MS's sleep mode exit |
|     } | | |
| } | | |

If 'Request Type' is '0x00', 'Frame Number for Next Scheduled Listening Window' denotes a start time of a next sleep cycle, i.e., a first frame of a listening window located at a start portion of a next sleep cycle. If 'Request Type' is 0x01, 'Approval Code' denotes approval/rejection of the BS as to 'Exit Sleep Mode' of the MS.

In the first exemplary embodiment of the present invention described with reference to FIG. 5 and FIG. 6, the MS transmits the sleep control signaling request message. However, according to another exemplary embodiment, an independent signaling message designed for a separate function may be used as the sleep control signaling request message. For example, the independent signaling message itself may denote 'Sleep Sync Info Request'. In addition, according to another exemplary embodiment of the present invention, the MS may transmit a Channel Quality Indication CHannel (CQICH), a dedicated Code Division Multiple Access (CDMA) code, or a special code for the purpose of synchronization, instead of the sleep control signaling request/response message.

Figure 7:
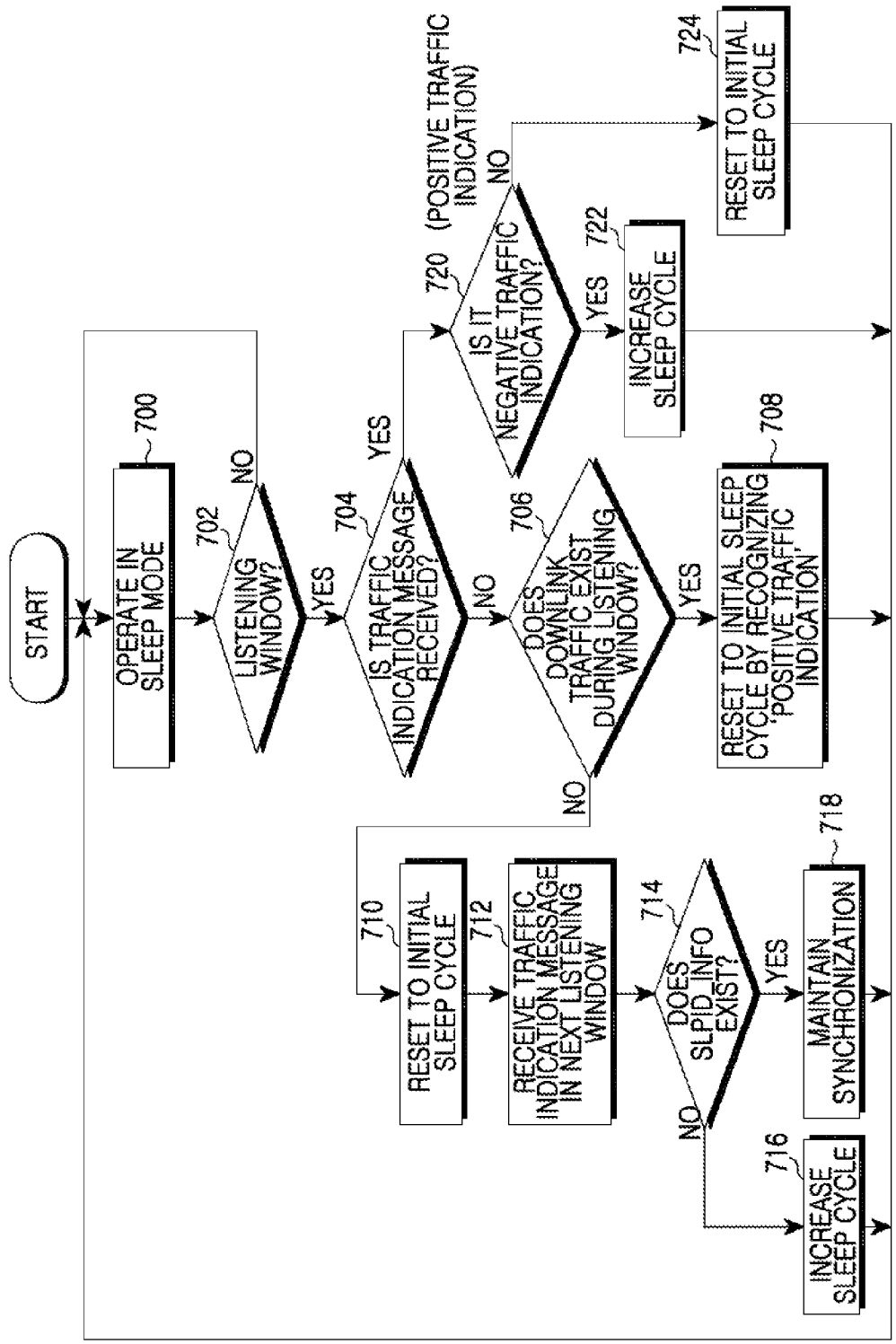
FIG. 7 is a flowchart illustrating an operation of an MS for controlling sleep cycle synchronization of a sleep mode in a wireless communication system according to an exemplary embodiment of the present invention.

FIG. 7 is a flowchart illustrating an operation of an MS for controlling sleep cycle synchronization of a sleep mode in a wireless communication system according to an exemplary embodiment of the present invention.

Referring to FIG. 7, the MS operates in the sleep mode in step 700. While operating in the sleep mode, the MS determines in step 702 whether a listening window starts according to a sleep cycle. If it is determined that the listening window does not start, returning to step 700, the MS maintains the sleep mode.

If it is determined that the listening window starts, the MS waits to receive a MOB_TRF-IND message during the listening window in step 704. The MOB_TRF-IND message indicates whether downlink traffic of the MS exists using a presence or absence of an identifier of the MS.

Upon receiving the MOB_TRF-IND message, the MS determines in step 720 whether the MOB_TRF-IND message indicates 'negative traffic indication' or 'positive traffic indication'. Whether the MOB_TRF-IND message indicates 'negative traffic indication' or 'positive traffic indication' is determined by whether the MOB_TRF-IND message includes identifier information of the MS. If it is determined that the identifier information is included, the MOB_TRF-IND message indicates 'positive traffic indication', and if it is determined that the identifier information is not included, the MOB_TRF-IND message indicates 'negative traffic indication'.

If the MOB_TRF-IND message indicates 'negative traffic indication', the MS increases the next sleep cycle to double the current sleep cycle in step 722. For example, if the length of the current sleep cycle is 4 frames, the length of the next sleep cycle is 8 frames. The BS sets the next sleep cycle to double the current sleep cycle while including 'negative traffic indication' in the MOB_TRF-IND message, and as a result, the MS recognizes 'negative traffic indication' and sets the next sleep cycle to double the current sleep cycle. Accordingly, the MS and the BS implicitly synchronize the sleep cycle.

If the MOB_TRF-IND message indicates 'positive traffic indication', the MS resets the next sleep cycle to the length of the initial sleep cycle in step 724. The BS sets the next sleep cycle of the MS to the initial sleep cycle while including 'positive traffic indication' in the MOB_TRF-IND message, and as a result, the MS recognizes 'positive traffic indication' and sets the next sleep cycle to the initial sleep cycle. Accordingly, the MS and the BS implicitly synchronize the sleep cycle.

If it is determined that the MOB_TRF-IND message is not received in step 704, then in step 706, the MS determines whether downlink traffic is received during a remaining listening window. If it is determined that the MOB_TRF-IND message is not received in this case, the MS cannot determine whether to double the length of the next sleep cycle or to reset the length of the next sleep cycle to the length of the initial sleep cycle. Therefore, the BS and the MS may operate according to different sleep cycles.

Even if the MS fails to receive the MOB_TRF-IND message in step 704, the MS can infer whether the MOB_TRF-IND message not received during the listening window includes 'positive traffic indication' or 'negative traffic indication' by determining whether downlink traffic is received during the remaining listening window in step 706. If the downlink traffic is received during the remaining listening window, the MS may determine that a presence of the downlink traffic of the MS is reported by including 'positive traffic indication', and if the downlink traffic is not received during the remaining listening window, the MS may determine that an absence of the downlink traffic of the MS is reported by including 'negative traffic indication'.

If it is determined that the downlink traffic is received during the remaining listening window in step 706, then in step 708, the MS recognizes that the MOB_TRF-IND message not received during the listening window includes 'positive traffic indication', and resets the length of the next sleep cycle to the length of the initial sleep cycle. For example, where the MS receives unicast downlink traffic from the BS during the remaining listening window (e.g., if the listening window is an interval corresponding to 4 frames, an interval corresponding to $2^{nd}$, $3^{rd}$, and $4^{th}$ frames other than a $1^{st}$ frame), even if the MOB_TRF-IND message is not received in the $1^{st}$ frame, the MS recognizes that the BS transmits 'positive traffic indication' information to the MS, and resets the current sleep cycle to the initial sleep cycle. If it is determined that the downlink traffic is not received during the remaining listening window in step 706, the MS resets the next sleep cycle to the initial sleep cycle in step 710.

In step 712, the MS waits to receive the MOB_TRF-IND message in the listening window of the initial sleep cycle. In this case, the MS may not be able to receive the MOB_TRF-IND message again. While not illustrated in FIG. 3, if the MS fails to receive the MOB_TRF-IND message in the listening window of the initial sleep cycle, the MS resets the next sleep cycle to the initial sleep cycle again in step 710, and waits to receive the MOB_TRF-IND message in the listening window of the initial sleep cycle.

In step 714, the MS determines whether its 'SLPID_Info' information included in the received MOB_TRF-IND message exists. The 'SLPID_Info' will be described in Table 4 below.

If it is determined that the 'SLPID_Info' information exists, the MS maintains sleep mode synchronization in step 718 by referencing the 'SLPID_Info' information. For example, if 'SLPID_Info' includes 'positive traffic indication', the MS resets the next sleep cycle to the initial sleep cycle, and if 'SLPID_Info' includes 'negative traffic indication', the MS sets the next sleep cycle to double the current sleep cycle. When the MOB_TRF-IND message and the downlink traffic are not received during the listening window in step 704, if the 'SLPID_Info' information of the MS exists in the MOB_TRF-IND message received in the listening window of the reset initial sleep cycle, it can be inferred that the MOB_TRF-IND message includes 'positive traffic indication' information in step 704.

If it is determined that the 'SLPID_Info' does not exist, then in step 716, the MS sets the next sleep cycle to double a sleep cycle related to transmission of the MOB_TRF-IND message in step 704. When the MOB_TRF-IND message and the downlink traffic are not received during the listening window in step 704, if the 'SLPID_Info' information of the MS does not exist in the MOB_TRF-IND message received in the listening window of the reset initial sleep cycle, it can be inferred that the MOB_TRF-IND message includes 'negative traffic indication' information in step 704. Therefore, instead of increasing a sleep cycle to double the reset initial sleep cycle in step 710, the MS increases the sleep cycle to double a sleep cycle corresponding to the MOB_TRF-IND message in step 704.

In the exemplary embodiment described with reference to FIG. 7, the MS doubles a sleep cycle upon receiving 'negative traffic indication', and resets the sleep cycle to a length of the initial sleep cycle upon receiving 'positive traffic indication'. Details of regulating a length of the sleep cycle based on a type of the traffic indication are determined according to a result of negotiation using MOB_SLP-REQ/RSP performed by the MS with the BS to enter the sleep mode. Therefore, the negotiation in which the sleep cycle is doubled upon receiving 'negative traffic indication' and the sleep cycle is reset to the length of the initial sleep cycle upon receiving 'positive traffic indication' is premised in the exemplary embodiment of FIG. 7.

Another negotiation is also possible according to another exemplary embodiment of the present invention. For example, the negotiation may be achieved under the premise that the sleep cycle is doubled upon receiving 'negative traffic indication' and the sleep cycle is also doubled upon receiving 'positive traffic indication'. In this case, the MS doubles the sleep cycle in step 708.

Figure 8:
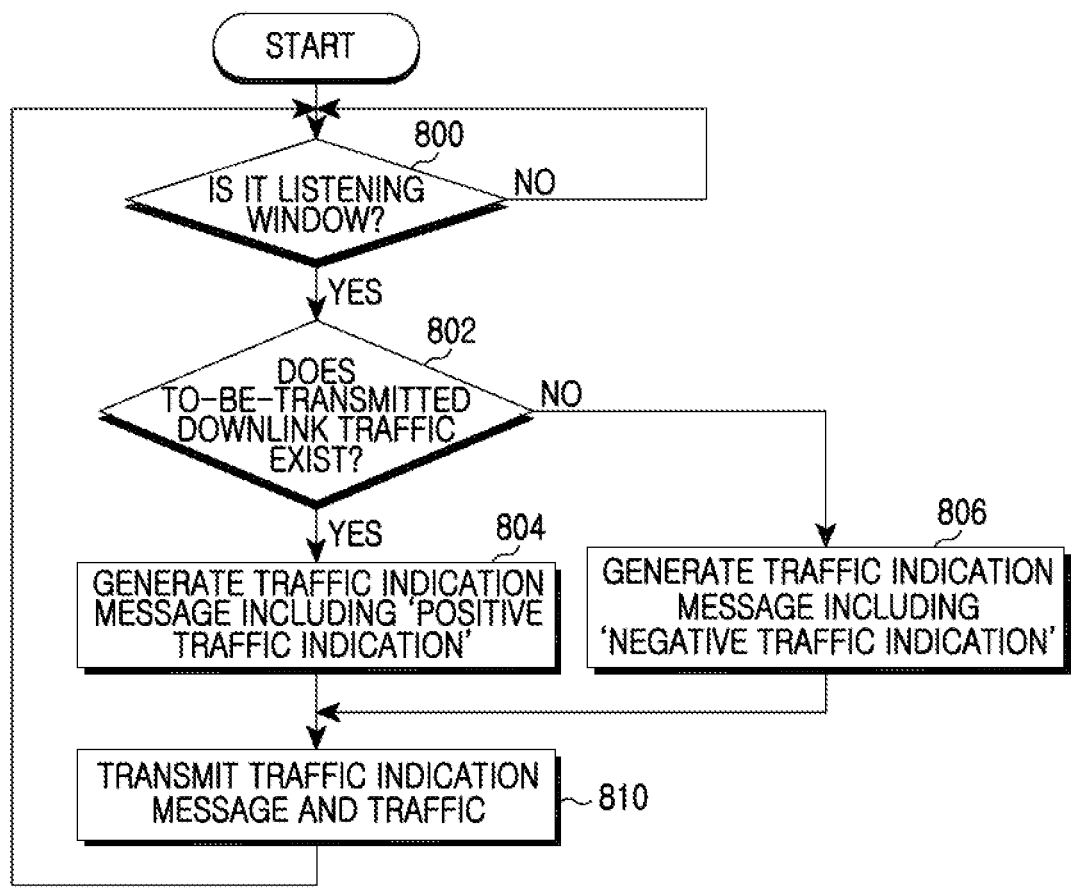
FIG. 8 is a flowchart illustrating an operation of a BS for controlling sleep cycle synchronization of a sleep mode in a wireless communication system according to an exemplary embodiment of the present invention.

FIG. 8 is a flowchart illustrating an operation of a BS for controlling sleep cycle synchronization of a sleep mode in a wireless communication system according to an exemplary embodiment of the present invention.

Referring to FIG. 8, the BS determines whether a listening window of an MS starts in step 800. If it is determined that the listening window does not start, step 800 is repeated. If it is determined that the listening window starts, the BS determines whether there is downlink traffic to be transmitted to the MS in step 802.

If it is determined that the downlink traffic to be transmitted to the MS exists in step 802, then in step 804, the BS includes identifier information of the MS and 'positive traffic indication' in the MOB_TRF-IND message. If it is determined that the downlink traffic to be transmitted to the MS does not exist, then in step 806 the BS includes the identification information of the MS and 'negative traffic indication' in the MOB_TRF-IND message.

In step 810, the BS transmits the MOB_TRF-IND message including identifier information of at least one MS and traffic indication information (i.e., 'positive traffic indication' or 'negative traffic indication') and optionally transmits downlink traffic of the MS.

Table 4 below shows a MOB_TRF-IND message format transmitted according to the exemplary embodiment illustrated in FIG. 8.

TABLE 4

| Syntax | Size (bit) | Notes |
|---|---|---|
| MOB_TRF-IND_Message_format( ) | | |
|     Management Message Type = 52 | 8 | |
|     Number of SLPID_Info | 8 | Number of SLPIDs |
|     For(i=0; i<Number of SLPID_Info { | | |
|         SLPID_Info | 12 | Bit#11-1: SLPID |
| | | Bit #0: Traffic Indication |
| | | 0: Negative Traffic Indication |
| | | 1: Positive Traffic Indication |
|     } | | |
|     Padding | variable | If needed, for alignment to byte boundary. |
|     TLV encoded items | variable | |
| } | | |

'Number of SLPID_Info' denotes the number of SLPID_Infos included in the MOB_TRF-IND message. SLeeP IDentification (SLPID) is identifier information of an MS which has to wake up in a specific frame to receive the MOB_TRF-IND message. SLPID_Info of all MSs scheduled to receive the MOB_TRF-IND message in a specific frame is included irrespective of 'positive traffic indication' or 'negative traffic indication'. The SLPID_Info parameter consists of two sub-parameters. The SLPID_Info parameter includes an SLPID assigned to the MS and traffic indication information. A traffic indication information value of '0' indicates 'negative traffic indication', and a traffic indication information value of '1' indicates 'positive traffic indication'.

According to an exemplary embodiment of the present invention, if the MS receives the MOB_TRF-IND message including 'negative traffic indication', the MS and the BS set a current sleep cycle to double a previous sleep cycle, and transition to the sleep mode irrespective of the remaining listening window. Otherwise, if the MS receives the MOB_TRF-IND message including 'positive traffic indication', the sleep cycle is reset to the initial sleep cycle, and downlink traffic is optionally received during the remaining listening window. Accordingly, the MS and the BS can implicitly know a start point of a next scheduled sleep cycle.

Figure 9:
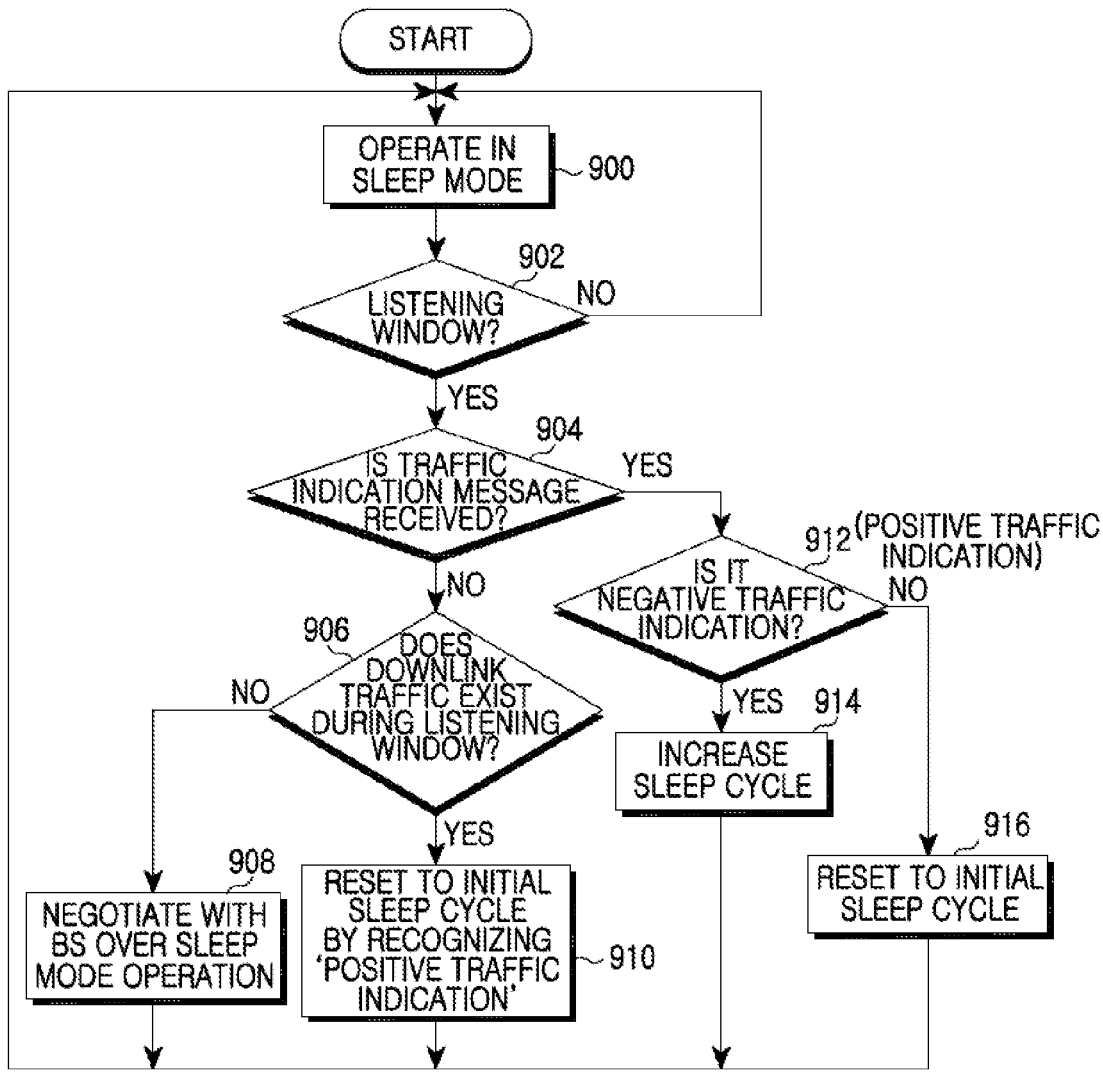
FIG. 9 is a flowchart illustrating an operation of an MS for controlling sleep cycle synchronization of a sleep mode in a wireless communication system according to an exemplary embodiment of the present invention.

FIG. 9 is a flowchart illustrating an operation of an MS for controlling sleep cycle synchronization of a sleep mode in a wireless communication system according to an exemplary embodiment of the present invention.

Referring to FIG. 9, the MS operates in the sleep mode in step 900. While operating in the sleep mode, the MS determines whether a listening window starts according to a sleep cycle in step 902. If it is determined that the listening window does not start, returning to step 900, the MS maintains the sleep mode.

If it is determined that the listening window starts, then in step 904, the MS waits to receive a MOB_TRF-IND message during the listening window. The MOB_TRF-IND message indicates whether downlink traffic of the MS exists by using a presence or absence of an identifier of the MS.

Upon receiving the MOB_TRF-IND message, the MS determines in step 912 whether the MOB_TRF-IND message indicates 'negative traffic indication' or 'positive traffic indication'. Whether the MOB_TRF-IND message indicates 'negative traffic indication' or 'positive traffic indication' is determined by whether the MOB_TRF-IND message includes identifier information of the MS. If it is determined that the identifier information is included, the MOB_TRF-IND message indicates 'positive traffic indication', and if it is determined that the identifier information is not included, the MOB_TRF-IND message indicates 'negative traffic indication'.

If the MOB_TRF-IND message indicates 'negative traffic indication', the MS increases a next sleep cycle to double a current sleep cycle in step 914. For example, if the length of the current sleep cycle is 4 frames, the length of the next sleep cycle is 8 frames. The BS sets the next sleep cycle to double the current sleep cycle while including 'negative traffic indication' in the MOB_TRF-IND message. As a result, the MS recognizes 'negative traffic indication' and sets the next sleep cycle to double the current sleep cycle. Accordingly, the MS and the BS implicitly synchronize the sleep cycle.

If the MOB_TRF-IND message indicates 'positive traffic indication', then the MS resets the next sleep cycle to a length of an initial sleep cycle in step 916. The BS sets the next sleep cycle of the MS to the initial sleep cycle while including 'positive traffic indication' in the MOB_TRF-IND message, and as a result, the MS recognizes 'positive traffic indication' and sets the next sleep cycle to the initial sleep cycle. Accordingly, the MS and the BS implicitly synchronize the sleep cycle.

If it is determined that the MOB_TRF-IND message is not received in step 904, the MS determines in step 906 whether downlink traffic is received during a remaining listening window. If the MOB_TRF-IND message is not received, the MS cannot determine whether to double the length of the next sleep cycle or to reset the length of the next sleep cycle to the length of the initial sleep cycle. Therefore, the BS and the MS may operate according to different sleep cycles.

Even if the MS fails to receive the MOB_TRF-IND message in step 904, the MS can infer whether the MOB_TRF-IND message not received during the listening window includes 'positive traffic indication' or 'negative traffic indication' by determining whether downlink traffic is received during the remaining listening window in step 906. If is determined that the downlink traffic is received during the remaining listening window, the MS may determine that a presence of the downlink traffic of the MS is reported by including 'positive traffic indication'. If it is determined that the downlink traffic is not received during the remaining listening window, the MS may determine that an absence of the downlink traffic of the MS is reported by including 'negative traffic indication'.

If the downlink traffic is received during the remaining listening window in step 906, then in step 910 the MS recognizes that the MOB_TRF-IND message not received during the listening window includes 'positive traffic indication', and resets the length of the next sleep cycle to the length of the initial sleep cycle.

If the downlink traffic is not received during the remaining listening window in step 906, then in step 908, the MS negotiates with the BS over a new sleep mode operation. When the MS transmits a MOB_SLP-REQ message to the BS and negotiation starts, the BS responds to the MOB_SLP-REQ message by transmitting a MOB_SLP-RSP message. Accordingly, by using a newly negotiated sleep mode parameter, a sleep mode operation starts from a designated frame (i.e., Start_Frame_Number), thereby solving a synchronization problem.

In the exemplary embodiment described with reference to FIG. 9, the MS doubles a sleep cycle upon receiving 'negative traffic indication', and resets the sleep cycle to a length of the initial sleep cycle upon receiving 'positive traffic indication'. Details of regulating a length of the sleep cycle based on a type of the traffic indication are determined according to a result of negotiation using MOB_SLP-REQ/RSP signaling performed by the MS with the BS to enter the sleep mode. Therefore, the negotiation in which the sleep cycle is doubled upon receiving 'negative traffic indication' and the sleep cycle is reset to the length of the initial sleep cycle upon receiving 'positive traffic indication' is premised in the exemplary embodiment illustrated in FIG. 9.

Another negotiation is also possible according to another exemplary embodiment of the present invention. For example, the negotiation may be achieved under the premise that the sleep cycle is doubled upon receiving 'negative traffic indication' and the sleep cycle is also doubled upon receiving 'positive traffic indication'. In this case, the MS doubles the sleep cycle in step 910.

Figure 10:
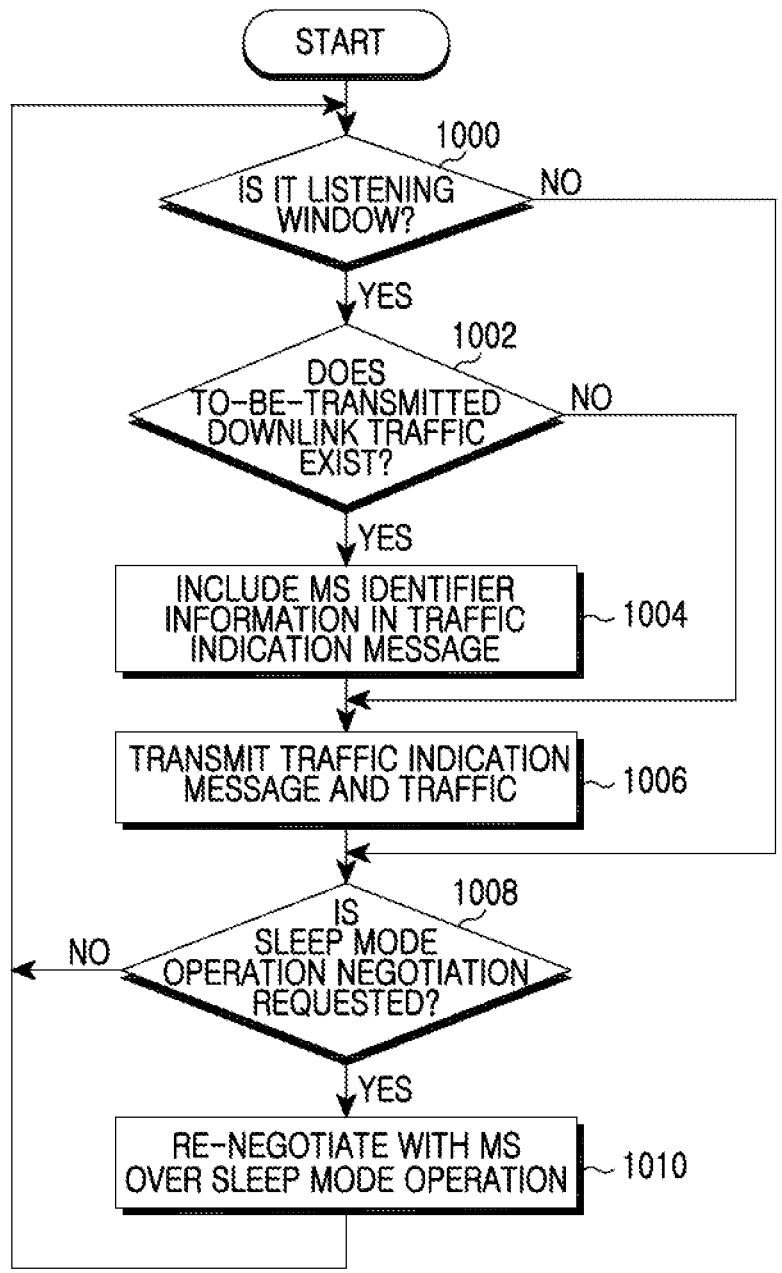
FIG. 10 is a flowchart illustrating an operation of a BS for controlling sleep cycle synchronization of a sleep mode in a wireless communication system according to an exemplary embodiment of the present invention.

FIG. 10 is a flowchart illustrating an operation of a BS for controlling sleep cycle synchronization of a sleep mode in a wireless communication system according to an exemplary embodiment of the present invention.

Referring to FIG. 10, the BS determines whether a listening window of an MS starts in step 1000. If it is determined that the listening window does not start, step 1000 is repeated. When it is determined that the listening window starts, the BS determines in step 1002 whether there is downlink traffic to be transmitted to the MS.

If it is determined that the downlink traffic to be transmitted to the MS exists, then in step 1004, the BS includes identifier information of the MS in the MOB_TRF-IND message. If it is determined that the downlink traffic to be transmitted to the MS does not exist, the BS does not include the identification information of the MS in the MOB_TRF-IND message.

Accordingly, by determining whether the identifier information of the MS is present in the MOB_TRF-IND message, the MS can determine whether the MOB_TRF-IND message indicates 'negative traffic indication' or 'positive traffic indication'.

In step 1006, the BS transmits the MOB_TRF-IND message including identifier information of at least one MS and optionally transmits downlink traffic of the MS. In step 1008, the BS waits to receive a sleep mode operation negotiation request from the at least one MS.

If there is no sleep mode operation negotiation request (e.g., a MOB_SLP-REQ message is not received from the MS), then a predetermined mode operation (not illustrated) is performed. If the sleep mode operation negotiation request is received (the MOB_SLP-REQ message is received from the MS) the process proceeds to step 1010. In step 1010, the BS transmits the sleep request message to the MS in response to the MOB_SLP-REQ message to re-negotiate over a parameter for a sleep mode operation.

Various exemplary embodiments of the present invention have been described above with respect to FIGS. 5-10 under the premise that the MOB_TRF-IND message is transmitted in the first frame of a listening window of the MS. However, if superframes having 4 frames each are employed by a wireless communication system according to an exemplary embodiment of the present invention, a start point of an arbitrary sleep cycle of the MS operating in the sleep mode may be a specific frame in a superframe. A start point of a listening window constituting a sleep cycle may be a different frame for each MS in a superframe. Therefore, listening windows having different start times may exist in one superframe.

Instead of transmitting the MOB_TRF-IND message at a start time of each listening window, the MOB_TRF-IND message may be entirely transmitted in a first frame of the superframe. In this case, one MOB_TRF-IND message representing a plurality of listening windows is transmitted. An MS that receives the MOB_TRF-IND message in a specific frame in the superframe waits to receive the MOB_TRF-IND message in the first frame of the superframe in which a start portion of the listening window is included. If the received MOB_TRF-IND message includes 'negative traffic indication', the MS doubles a current sleep cycle, and directly transitions to a sleep state without having to wake up in an original listening window. If the received MOB_TRF-IND message includes 'positive traffic indication', the MS resets the sleep cycle to an initial sleep cycle. At the same time, the MS can perform a micro sleep operation until the original listening window starts (i.e., after frames 0 to 3), and transmits/receives data in the listening window.

If the MOB_TRF-IND message is not received, the MS should wake up in the listening window to operate according exemplary embodiments of the present invention described above with respect to FIGS. 5-10. In this case, the waiting to receive of the MOB_TRF-IND message is skipped.

The MS may not be able to receive the MOB_TRF-IND message for various reasons. For example, the MOB_TRF-IND message may not be received due to a change in system information or the like. For example, if the MS does not recognize a change in system information, such as Secondary Super Frame Header SubPacket Information Element (S-SFH SP IE), the MS may not be able to receive the MOB_TRF-IND message. If the system information changes, uplink data transmission of the MS is prohibited until the changed system information broadcast is received from the BS. However, the restriction for the prohibition of uplink data transmission is contradictory to a process of inquiring traffic indication information of the MS by transmitting a sleep control signaling message by the MS to the BS according to exemplary embodiments of the present invention.

After receiving the changed system information, the MS may transmit the sleep control signaling message. If a greater number of frames are used until the changed system information is completely received, a frame in which the MOB_TRF-IND message is not received may not be able to be expressed with the limited number of 'Frame Number' bits included in the sleep control signaling message. Further, if the MOB_TRF-IND message not received by the MS indicates 'positive traffic indication', a sleep cycle is reset to the initial sleep cycle, and thus a next scheduled listening window may be located in the middle of receiving the changed system information. In this case, it is meaningless to report a frame number of a listening window in which the MS fails to receive the MOB_TRF-IND message. This is because synchronization cannot be correctly performed since the MS fails to receive the MOB_TRF-IND message in a different listening window other than the listening window including the MOB_TRF-IND message not received by the MS. Therefore, in a method to be described below according to an exemplary embodiment of the present invention, a frame number indicating a listening window in which the MOB_TRF-IND message is not received is not reported.

Figure 11:
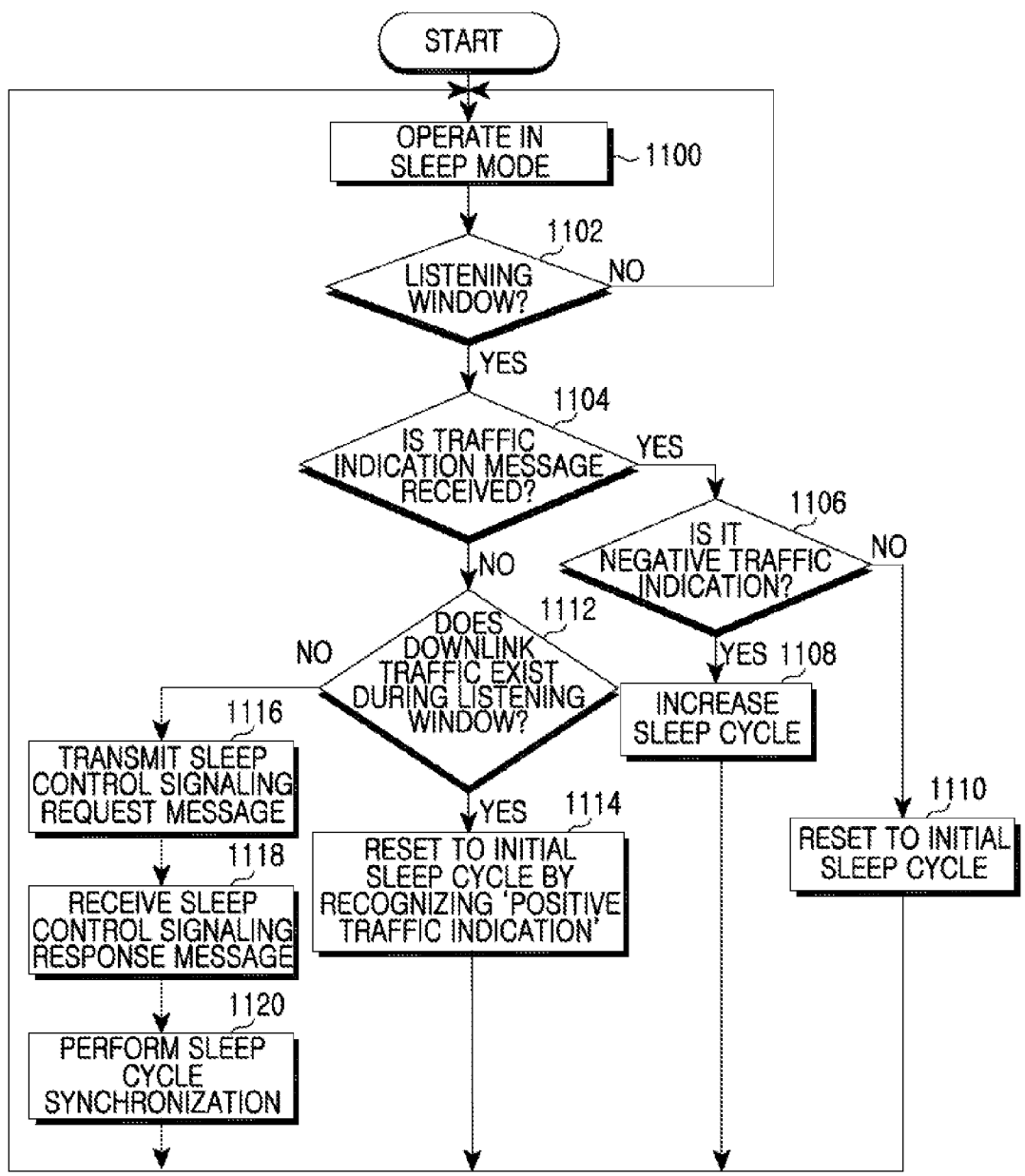
FIG. 11 is a flowchart illustrating an operation of an MS for controlling sleep cycle synchronization of a sleep mode in a wireless communication system according to an exemplary embodiment of the present invention.

FIG. 11 is a flowchart illustrating an operation of an MS for controlling sleep cycle synchronization of a sleep mode in a wireless communication system according to an exemplary embodiment of the present invention.

Referring to FIG. 11, the MS operates in the sleep mode in step 1100. While operating in the sleep mode, the MS determines in step 1102 whether a listening window starts according to a sleep cycle. If it is determined that the listening window does not start, returning to step 1100, the MS maintains the sleep mode.

If it is determined that the listening window starts, the MS waits to receive a MOB_TRF-IND message during the listening window in step 1104. The presence or absence of an identifier of the MS in the MOB_TRF-IND message indicates whether downlink traffic of the MS is present.

Upon receiving the MOB_TRF-IND message, the MS determines in step 1106 whether the MOB_TRF-IND message indicates 'negative traffic indication' or 'positive traffic indication'. Whether the MOB_TRF-IND message indicates 'negative traffic indication' or 'positive traffic indication' is determined by whether the MOB_TRF-IND message includes identifier information of the MS. If the identifier information is included, the MOB_TRF-IND message indicates 'positive traffic indication', and if the identifier information is not included, the MOB_TRF-IND message indicates 'negative traffic indication'.

If the MOB_TRF-IND message indicates 'negative traffic indication', the MS increases a next sleep cycle to double a current sleep cycle in step 1108. For example, if the length of the current sleep cycle is 4 frames, the length of the next sleep cycle is 8 frames. The BS sets the next sleep cycle to double the current sleep cycle while including 'negative traffic indication' in the MOB_TRF-IND message, and as a result, the MS recognizes 'negative traffic indication' and sets the next sleep cycle to double the current sleep cycle. Accordingly, the MS and the BS implicitly synchronize the sleep cycle.

If it is determined that the MOB_TRF-IND message indicates 'positive traffic indication', the MS resets the next sleep cycle to a length of an initial sleep cycle in step 1110. The BS sets the next sleep cycle of the MS to the initial sleep cycle while including 'positive traffic indication' in the MOB_TRF-IND message, and as a result, the MS recognizes 'positive traffic indication' and sets the next sleep cycle to the initial sleep cycle. Accordingly, the MS and the BS implicitly synchronize the sleep cycle.

If it is determined that the MOB_TRF-IND message is not received in step 1104, the MS determines in step 1112 whether downlink traffic is received during a remaining listening window. Since the MOB_TRF-IND message is not received in this case, the MS cannot determine whether to double the length of the next sleep cycle or to reset the length of the next sleep cycle to the length of the initial sleep cycle. Therefore, in this case, the BS and the MS may operate according to different sleep cycles.

Even if the MS fails to receive the MOB_TRF-IND message, the MS can infer whether the MOB_TRF-IND message not received during the listening window indicates 'positive traffic indication' or 'negative traffic indication' by determining whether downlink traffic is received during the remaining listening window in step 1106. If it is determined that the downlink traffic is received during the remaining listening window, then a presence of the downlink traffic is reported by 'positive traffic indication' included in the MOB_TRF-IND message. If it is determined that the downlink traffic is not received during the remaining listening window, then an absence of the downlink traffic is reported by 'negative traffic indication' included in the MOB_TRF-IND message.

If it is determined that the downlink traffic is received during the remaining listening window, then in step 1114, the MS recognizes that the MOB_TRF-IND message not received during the listening window indicates 'positive traffic indication', and resets the length of the next sleep cycle to the length of the initial sleep cycle.

Otherwise, if it is determined that the downlink traffic is not received during the remaining listening window, then in step 1116, the MS transmits a sleep control signaling request message to report to the BS that the MOB_TRF-IND message is not received during the listening window in step 1104. In addition, the MS requests a start time of a next sleep cycle and a length of a sleep cycle including the next scheduled listening window using the sleep control signaling request message. For example, the sleep control signaling request message may be configured as shown in Table 5 below.

TABLE 5

| Syntax | Size (bit) | Notes |
|---|---|---|
| Sleep Control Signaling Header format( ) { | | |
|     Management Message Type = XX | 8 | |
|     MSID | 8 | MS ID |
|     Request_Type | 8 | 0x00: Sleep Sync Info Request |
| | | 0x01: Exit Sleep Mode |
| } | | |

'MSID' denotes an identifier of the MS. 'Request_Type' denotes a request type indicating whether a request is a request for sleep mode synchronization or a request for a transition from the sleep mode to the active mode. For example, if 'Request_Type' is '0x00', this implies requesting the provision of information for addressing an inconsistent synchronization problem while reporting occurrence of the inconsistent synchronization caused by non-reception of the MOB_TRF-IND message. If 'Request_Type' is '0x01', this implies that the MS intends to release the sleep mode. According to 'Exit Sleep Mode', the sleep control signaling request message may be used for purposes other than addressing the problem of inconsistent sleep mode synchronization. Therefore, if the sleep control signaling request message is used only to address the problem of inconsistent sleep mode synchronization, 'Request_Type' information may be omitted.

In step 1118, the MS receives a sleep control signaling response message as a response for the sleep control signaling request message. Accordingly, the MS knows a start time of a next sleep cycle and a length of a sleep cycle including the next scheduled listening window using the sleep control signaling response message.

In step 1120, the MS performs synchronization of the sleep cycle using the start time of the next sleep cycle and the length of the sleep cycle including the next scheduled listening window. The MS sets the length of the next sleep cycle to the length of the sleep cycle including the next scheduled listening window, and starts the next sleep cycle from the start time of the next sleep cycle. Accordingly, the MS receives 'positive traffic indication' or 'negative traffic indication' in the next scheduled listening window. Upon receiving 'positive traffic indication', the MS resets the sleep cycle including the listening window to the length of the initial sleep cycle without referencing 'Length of Sleep Cycle'. Otherwise, upon receiving 'negative traffic indication', the MS increases the listening window to double a previous sleep cycle. In this case, the MS determines a length of the doubled sleep cycle by referencing 'Length of Sleep Cycle'.

In the exemplary embodiment described with reference to FIG. 11, the MS doubles a sleep cycle upon receiving 'negative traffic indication', and resets the sleep cycle to a length of the initial sleep cycle upon receiving 'positive traffic indication'. Details of regulating a length of the sleep cycle based on a type of the traffic indication are determined according to a result of negotiation using MOB_SLP-REQ/RSP signaling performed by the MS with the BS to enter the sleep mode. Therefore, the negotiation in which the sleep cycle is doubled upon receiving 'negative traffic indication' and the sleep cycle is reset to the length of the initial sleep cycle upon receiving 'positive traffic indication' is premised in the embodiment of FIG. 11.

Another negotiation is also possible according to another exemplary embodiment of the present invention. For example, the negotiation may be achieved under the premise that the sleep cycle is doubled upon receiving 'negative traffic indication' and the sleep cycle is also doubled upon receiving 'positive traffic indication'. In this case, the MS doubles the sleep cycle in step 1114.

The sleep control signaling request message of step 1116 may be defined as another term. For example, the sleep control signaling request message may be defined as an Advanced Air Interface Traffic Indication-Request (AAI TRF IND-REQ) message. In addition, the sleep control signaling request message may be defined in a widely used header format. For example, the sleep control signaling request message may be defined as a Sleep Control Header (SCH) and a Sleep Control Extended Header (SCEH).

In the exemplary embodiment described with reference to FIG. 11, it is assumed that the MS successfully receives the sleep control signaling response message. However, the MS may not receive the sleep control signaling response message due to channel deterioration, other environmental conditions, and so on. Therefore, the MS should re-transmit the sleep control signaling request message when the MS determines that the sleep control signaling response message is lost. According to an exemplary embodiment, the MS may determine that the sleep control signaling response message is lost when a predefined time period is passed without receiving the sleep control signaling response message from transmitting the sleep control signaling request message. According to another exemplary embodiment, the MS may determine that the sleep control signaling response message is lost when the number of Hybrid Automatic Repeat Request (HARQ) retransmission of the sleep control signaling response message reaches the maximum HARQ retransmission. According to another exemplary embodiment, the MS may determine that the sleep control signaling response message is lost when a local Non-ACKnowledge (NAK) for the sleep control signaling response message occurs in a physical layer.

Figure 12:
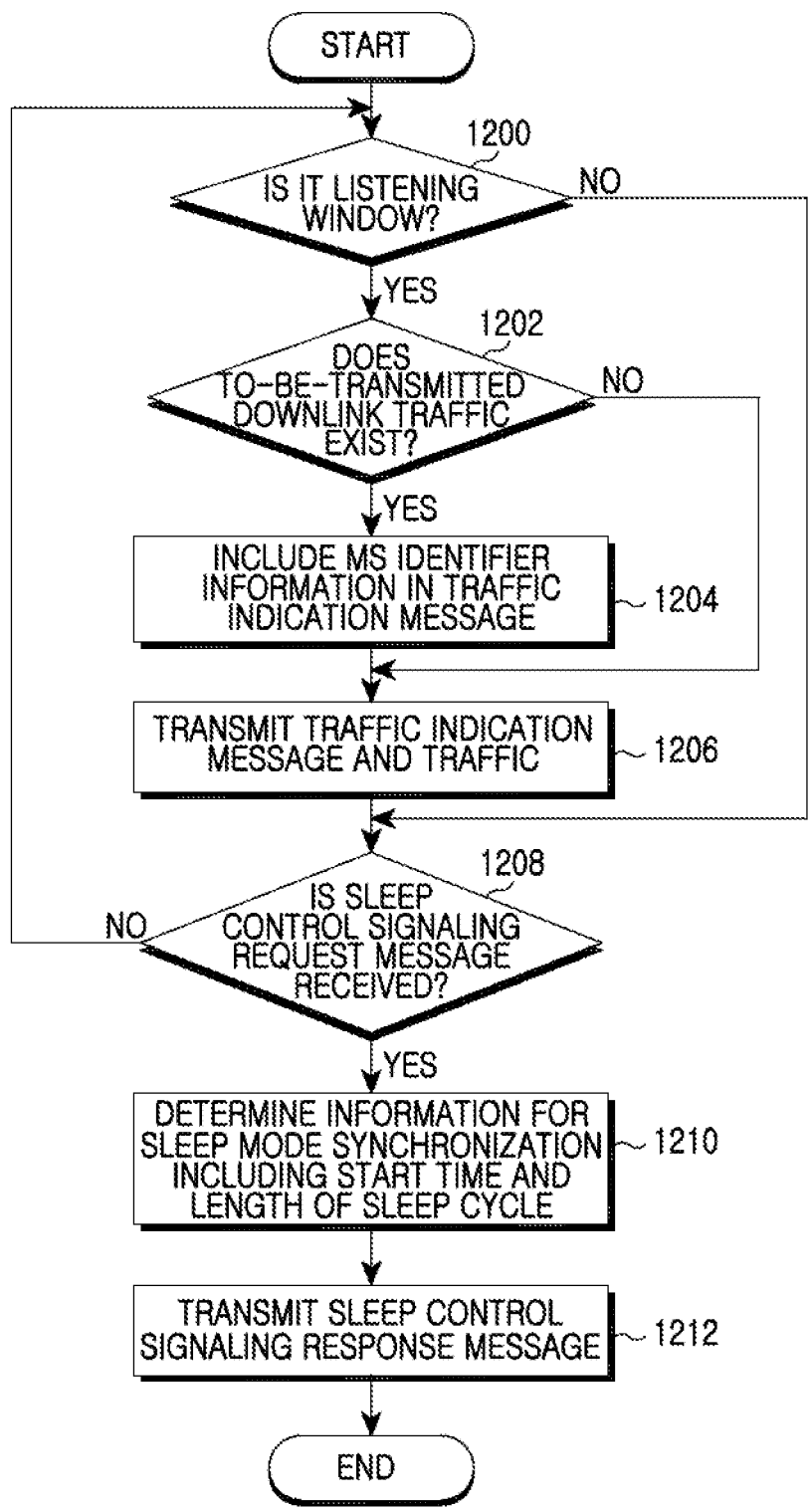
FIG. 12 is a flowchart illustrating an operation of a BS for controlling sleep cycle synchronization of a sleep mode in a wireless communication system according to an exemplary embodiment of the present invention.

FIG. 12 is a flowchart illustrating an operation of a BS for controlling sleep cycle synchronization of a sleep mode in a wireless communication system according to an exemplary embodiment of the present invention.

Referring to FIG. 12, the BS determines whether a listening window of an MS starts in step 1200. If it is determined that the listening window starts, the BS determines in step 1202 whether there is downlink traffic to be transmitted to the MS.

If it is determined that there is downlink traffic to be transmitted to the MS, then in step 1204, the BS includes identifier information of the MS in a MOB_TRF-IND message. By including the identifier information of the MS in the MOB_TRF-IND message, the MOB_TRF-IND message is recognized by the MS as 'positive traffic indication'. If there is no downlink traffic to be transmitted to the MS, step 1204 is skipped. Therefore, the MS determines whether the MOB_TRF-IND message indicates 'negative traffic indication' or 'positive traffic indication' according to whether the identifier information of the MS is included in the MOB_TRF-IND message.

In step 1206, the BS transmits the MOB_TRF-IND message including identifier information of at least one MS and the downlink traffic of the MS. Transmission of the downlink traffic of the MS may be skipped according to the determination result of step 1202.

In step 1208, the BS determines whether a sleep control signaling request message is received from the MS. The sleep control signaling request message is a message requesting information for sleep mode synchronization, and is configured, for example, as shown in Table 5 above. If the sleep control signaling request is not received, the BS returns to step 1200.

Upon receiving the sleep control signaling request message, the BS determines information for sleep mode synchronization in step 1210. The information for sleep mode synchronization is start time information of a next sleep cycle and a length of a sleep cycle including the next scheduled listening window.

After determining the information for sleep mode synchronization, the BS transmits to the MS a sleep control signaling response message including the information of sleep mode synchronization in step 1212. For example, the sleep control signaling response message may be configured as shown in Table 6 below.

TABLE 6

| Syntax | Size (bit) | Notes |
| --- | --- | --- |
| Sleep Control Signaling Response format( ) { | | |
|     Management Message Type = XX | 8 | |
|     MSID | 8 | |
|     Request_Type | 8 | 0x00: Sleep Sync Info Request<br>0x01: Exit Sleep Mode |
|     If(Request_Type == 0x00) { | | |
|         Frame_Number for Next Scheduled Listening Window | 10 | 0: Negative Traffic Indication<br>1: Positive Traffic Indication |
|         Length of Sleep Cycle | | |
|     }else if(Request_Type == 0x01) { | | |
|         Approval Code | 1 | 0: Reject MS's sleep mode exit<br>1: Approved MS's sleep mode exit |
|     } | | |
| } | | |

If 'Request Type' is '0x00', 'Frame_Number for Next Scheduled Listening Window' denotes a start time of a next sleep cycle, that is, a first frame of a listening window located in a start portion of a next sleep cycle. 'Length of Sleep Cycle' denotes a length of a sleep cycle including the next scheduled listening window. If 'Request Type' is 0x01, 'Approval Code' indicate approval/rejection of the BS as to 'Exit Sleep Mode' of the MS.

Details of 'Length of Sleep Cycle' indicating the length of the sleep cycle including the next scheduled listening window will now be described. 'Length of Sleep Cycle' denotes a length of a sleep cycle including the listening window when 'negative traffic indication' is transmitted in the listening window, which is double an immediately previous sleep cycle. Therefore, if the MS receives 'positive traffic indication' in the listening window, the MS resets the sleep cycle including the listening window to a length of an initial sleep cycle without referencing 'Length of Sleep Cycle'. Otherwise, upon receiving 'negative traffic indication', the MS should increase the listening window to double the previous sleep cycle. In this case, 'Length of Sleep Cycle' denotes a length of the doubled sleep cycle.

Optionally, 'Length of Sleep Cycle' may be used even if 'positive traffic indication' is received. For example, if the MS and the BS double the sleep cycle without resetting the sleep cycle even if 'positive traffic indication' is received according to a sleep cycle pattern negotiated using an SLP-REQ/RSP message by the MS and the BS, then 'Length of Sleep Cycle' should be used even if 'positive traffic indication' is received. Even if 'positive traffic indication' is received, the MS should know the length of the sleep cycle when the sleep cycle is doubled, and thus 'Length of Sleep Cycle' has to be delivered.

In summary, when the sleep cycle is increased to double a length of a previous sleep cycle, 'Length of Sleep Cycle' denotes a length of the doubled cycle. Whether to double the cycle is negotiated using MOB_SLP-REQ/RSP signaling, and several cases are possible according to the negotiation result. As to the following two cases, the MS determines the length of the sleep cycle to be increased to double the previous sleep cycle according to 'Length of Sleep Cycle':

1) Even if 'positive traffic indication' is received, the length is doubled.

2) If 'negative traffic indication' is received, the length is doubled without exception.

The sleep control signaling response message transmitted in step 1212 may be defined in another term. For example, the sleep control signaling request message may be defined as an AAI TRF IND-REQ message. In addition, the sleep control signaling request message may be defined in a widely used header format. For example, the sleep control signaling request message may be defined as an SCH and an SCEH. In this case, the AAI TRF IND-RSP message, the SCH, or the SCEH includes 'Frame_Number' indicating a starting frame number of a next scheduled sleep cycle and 'Length of Sleep Cycle' indicating a size of the next scheduled sleep cycle.

In the exemplary embodiment of the present invention described with reference to FIG. 11 and FIG. 12, the 'Length of Sleep Cycle' indicates a size of the next scheduled sleep cycle. The 'Length of Sleep Cycle' indicates a doubled size of sleep cycle due to 'Negative Traffic Indication'. However, according to another exemplary embodiment, the 'Length of Sleep Cycle' indicates a size of a previous sleep cycle of the next scheduled sleep cycle.

Therefore, when an MS needs to increase a sleep cycle to double, the MS uses a value of the 'Length of Sleep Cycle' as doubled size of the sleep cycle according to the exemplary embodiment of the present invention described with reference to FIG. 11. However, according to another exemplary embodiment, the MS uses a double value of the 'Length of Sleep Cycle' as the doubled size of the sleep cycle.

In the fourth exemplary embodiment of the present invention described with reference to FIG. 11 and FIG. 12, the MS transmits the sleep control signaling request message. However, according to another exemplary embodiment, an independent signaling message designed for a separate function may be used as the sleep control signaling request message. For example, the independent signaling message itself may denote 'Sleep Sync Info Request'. In addition, according to another exemplary embodiment of the present invention, the MS may transmit a CQICH, a dedicated CDMA code, or a special code for the purpose of synchronization, instead of the sleep control signaling request/response message.

Figure 13:
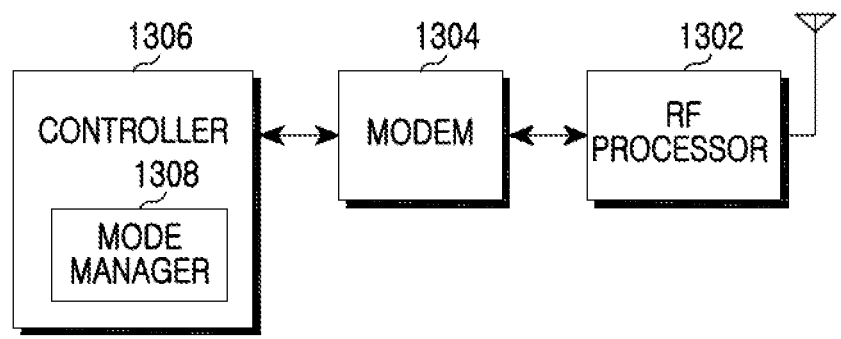
FIG. 13 is a block diagram illustrating a structure of an MS in a wireless communication system according to an exemplary embodiment of the present invention.

FIG. 13 is a block diagram illustrating a structure of an MS in a wireless communication system according to an exemplary embodiment of the present invention.

Referring to FIG. 13, the MS includes a Radio Frequency (RF) processor 1302, a modem 1304, and a controller 1306. The MS may also include additional and/or different units. Similarly, the functionality of two or more of the above units may be integrated into a single component.

The RF processor 1302 transmits and receives a signal through a radio channel, including operations such as signal band conversion, amplification, or the like. The RF processor 1302 up-converts a baseband signal provided from the modem 1304 into an RF band signal and then transmits the RF band signal through an antenna, and down-converts the RF band signal received through the antenna into a baseband signal.

The modem 1304 converts between the baseband signal and a bit-stream according to a physical layer protocol of the system. For example, in data transmission, the modem 1304 generates complex symbols by performing coding and modulation on a Transmit (Tx) bit-stream, maps the complex symbols to subcarriers, and configures Orthogonal Frequency Division Multiplexing (OFDM) symbols by performing an Inverse Fast Fourier Transform (IFFT) operation and inserting a Cyclic Prefix (CP). In data reception, the modem 1304 divides the baseband signal provided from the RF processor 1302 in an OFDM symbol unit, restores signals mapped to subcarriers by performing an FFT operation, and then restores a Receive (Rx) bit-stream by performing demodulation and decoding.

The controller 1306 controls overall functions of the MS. For example, the controller 1306 generates and analyzes a Media Access Control (MAC) control message transmitted to and received from a BS. The controller 1306 includes a mode manager 1308 for determining an operation mode of the MS and for controlling the MS to operate according to the determined operation mode. The mode manager 1308 determines whether to transition to a sleep mode according to how frequently Tx/Rx traffic is generated. If the transition is made to the sleep mode, the mode manager 1308 controls switching between a sleep state and an active state according to a sleep window and a listening window in a sleep cycle. During the sleep window of the sleep mode, the controller 1306 does not perform signal reception operations. During the listening window of the sleep mode, the controller 1306 determines whether there is downlink traffic to the MS by using a MOB_TRF-IND message received from the BS. Further, the mode manager 1308 regulates a length of the sleep cycle according to the presence of downlink traffic.

Details of regulating the length of the sleep cycle are determined according to a result of MOB_SLP-REQ/RSP signaling performed to enter the sleep mode. For example, the length may be regulated such that the sleep cycle is doubled upon receiving 'negative traffic indication' and the sleep cycle is reset to the length of the initial sleep cycle upon receiving 'positive traffic indication', or such that the sleep cycle is doubled upon receiving 'negative traffic indication' and the sleep cycle is also doubled upon receiving 'positive traffic indication'. In this case, if the MOB_TRF-IND message is not received during the listening window, the controller 1306 performs the following function for a case of inconsistent sleep cycle synchronization with the BS.

If the MOB_TRF-IND message is not received during the listening window (if the MOB_TRF-IND message is lost or not detected), the controller 1306 determines whether downlink traffic is received during a remaining listening window. If the downlink traffic is received during the remaining listening window, the controller 1306 determines that the MOB_TRF-IND message not received during the listening window indicates 'positive traffic indication', and resets a length of a next sleep cycle to a length of an initial sleep cycle. If the downlink traffic is not received during the remaining listening window, the controller 1306 generates a sleep control signaling request message, and transmits the sleep control signaling request message to the BS via the modem 1304 and the RF processor 1302. The controller 1306 reports to the BS that the MOB_TRF-IND message is not received during the listening window by using the sleep control signaling request message, and requests a start time of a next sleep cycle and a length of a sleep cycle including the next scheduled listening window. For example, the sleep control signaling request message is configured as shown in Table 5 above. Thereafter, upon receiving a sleep control signaling response message in response to the sleep control signaling request message via the RF processor 1302 and the modem 1304, the controller 1306 determines the start time of the next sleep cycle included in the sleep control signaling response message and the length of the sleep cycle including the next scheduled listening window.

The mode manager 1308 performs synchronization of the sleep cycle using the start time of the next sleep cycle and the length of the sleep cycle including the next scheduled listening window. The mode manager 1308 receives the MOB_TRF-IND message during a sleep window starting from a start time of the next sleep cycle. If the MOB_TRF-IND message includes 'positive traffic indication', the mode manager 1308 resets a length of a specific sleep cycle. If the MOB_TRF-IND message includes 'negative traffic indication', the mode manager 1308 sets the length of the specific sleep cycle to the length of the sleep cycle including the next scheduled listening window.

In the aforementioned exemplary embodiment, the controller 1306 requests a length of the sleep cycle including the next scheduled listening window using the sleep control signaling request message, and, receives the length of the sleep cycle including the next scheduled listening window using the sleep control signaling response message. According to another exemplary embodiment, the length of the sleep cycle including the next scheduled listening window may be replaced by a length of a previous sleep cycle of the sleep cycle including the next scheduled listening window.

In the aforementioned embodiment, the MS may not receive the sleep control signaling response message due to channel deterioration, other environmental conditions, and so on. Therefore, the controller 1306 should control to re-transmit the sleep control signaling request message when the controller 1306 determines that the sleep control signaling response message is lost. According to an exemplary embodiment, the controller 1306 may determine that the sleep control signaling response message is lost when a predefined time period is passed without receiving the sleep control signaling response message from transmitting the sleep control signaling request message. According to another exemplary embodiment, the controller 1306 may determine that the sleep control signaling response message is lost when the number of HARQ retransmission of the sleep control signaling response message reaches the maximum HARQ retransmission. According to another exemplary embodiment, the controller 1306 may determine that the sleep control signaling response message is lost when a local NAK for the sleep control signaling response message occurs in a physical layer.

In the aforementioned embodiment, the sleep control signaling request message may be defined as another term. For example, the sleep control signaling request message may be defined as an AAI TRF IND-REQ message. In addition, the sleep control signaling request message may be defined in a widely used header format. For example, the sleep control signaling request message may be defined as an SCH and an SCEH.

Figure 14:
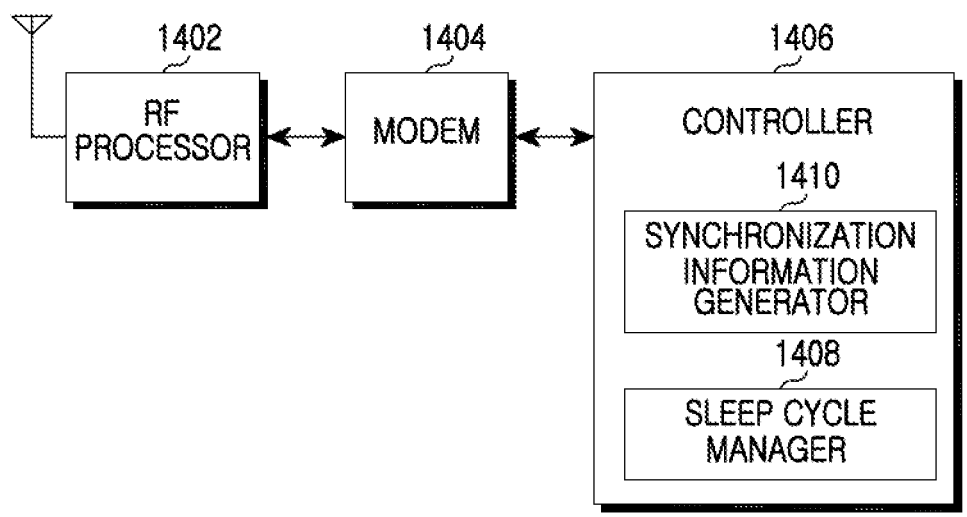
FIG. 14 is a block diagram illustrating a structure of a BS in a wireless communication system according to an exemplary embodiment of the present invention.

FIG. 14 is a block diagram illustrating a structure of a BS in a wireless communication system according to an exemplary embodiment of the present invention.

Referring to FIG. 14, the BS includes an RF processor 1402, a modem 1404, and a controller 1406.

The RF processor 1402 transmits and receives a signal through a radio channel, and may perform signal band conversion, amplification, or the like. The RF processor 1402 up-converts a baseband signal provided from the modem 1404 into an RF band signal and then transmits the RF band signal through an antenna, and down-converts the RF band signal received through the antenna into a baseband signal.

The modem 1404 converts between the baseband signal and a bit-stream according to a physical layer protocol of the system. For example, in data transmission, the modem 1404 generates complex symbols by performing coding and modulation on a Tx bit-stream, maps the complex symbols to subcarriers, and configures OFDM symbols by performing an IFFT operation and inserting a CP. In data reception, the modem 1404 divides the baseband signal provided from the RF processor 1402 in an OFDM symbol unit, restores signals mapped to subcarriers by performing an FFT operation, and then restores an Rx bit-stream by performing demodulation and decoding.

The controller 1406 controls overall functions of the BS. For example, the controller 1406 generates and analyzes a MAC control message transmitted to and received from an MS. The controller 1406 determines an operation mode of the MS at the request of the MS or without any request, and generates a message indicating the determined operation mode. The operation mode includes a sleep mode and an active mode. The controller 1406 includes a sleep cycle manager 1408 for managing a sleep cycle of at least one MS operating in the sleep mode. The sleep cycle increases or decreases according to a progression of the sleep mode, and may differ from one MS to another. In addition, the controller 1406 generates a MOB_TRF-IND message transmitted during a listening window of the MS.

The controller 1406 also includes a synchronization information generator 1410 for generating information to solve a problem of inconsistent sleep cycle synchronization with the BS by an MS which fails to receive the MOB_TRF-IND message during the listening window. The synchronization information generator 1410 generates synchronization information upon receiving a sleep control signaling request message from the MS. The information for sleep mode synchronization may include start time information of a next sleep cycle and a length of a sleep cycle including the next scheduled listening window. The controller 1406 generates a sleep control signaling response message including the synchronization information, and transmits the sleep control signaling response message via the modem 1404 and the RF processor 1402. For example, the sleep control signaling response message is configured as shown in Table 6 above.

In the aforementioned embodiment, the sleep control signaling response message may be defined as another term. For example, the sleep control signaling response message may be defined as an Advanced Air Interface Traffic Indication-Response (AAI TRF IND-RSP) message. In addition, the sleep control signaling request message may be defined in a widely used header format. For example, the sleep control signaling request message may be defined as an SCH and an SCEH. In this case, the AAI TRF IND-RSP message, the SCH, or the SCEH includes 'Frame_Number' indicating a starting frame number of a next scheduled sleep cycle and 'Length of Sleep Cycle' indicating a size of the next scheduled sleep cycle.

In the aforementioned exemplary embodiment, the controller 1406 receives a request to provide a length of the sleep cycle including the next scheduled listening window using the sleep control signaling request message, and provides the length of the sleep cycle including the next scheduled listening window using the sleep control signaling response message. According to another exemplary embodiment, the length of the sleep cycle including the next scheduled listening window may be replaced a length of a previous sleep cycle of the sleep cycle including the next scheduled listening window.

According to the structures of the MS and the BS described above with reference to FIG. 13 and FIG. 14, the MS transmits the sleep control signaling request message. However, according to another exemplary embodiment, an independent signaling message designed for a separate function may be used as the sleep control signaling request message. For example, the independent signaling message itself may denote 'Sleep Sync Info Request'. In addition, according to another exemplary embodiment of the present invention, the MS may transmit a CQICH, a dedicated CDMA code, or a special code for the purpose of synchronization, instead of the sleep control signaling request/response message.

According to exemplary embodiments of the present invention, a state transition between an MS and a BS is controlled using sleep control signaling so that sleep mode synchronization is maintained even if a MOB_TRF-IND message is not received.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a Mobile Station (MS) in a sleep mode state in a wireless communication system, the method comprising:
    if a traffic indication message and unicast data are not received in a listening window, transmitting one of a request message and a first header to a Base Station (BS) to request a location of a next-scheduled listening window; and
    performing synchronization for a next sleep cycle upon receiving a response for the one of request message and the header.

2. The method of claim 1, wherein the transmitting of the one of the request message and the first header comprises:
    transmitting the one of the request message and the header to the BS to request a starting frame number of a next-scheduled sleep cycle and a size of the next-scheduled sleep cycle.

3. The method of claim 2, wherein the request message comprises an Air Interface Traffic Indication-Request (AAI TRF IND-REQ) message.

4. The method of claim 2, wherein the first header comprises one of a Sleep Control Header (SCH) and a Sleep Control Extended Header (SCEH).

5. The method of claim 1, wherein the response comprises one of a response message and a second header.

6. The method of claim 5, wherein the response message comprises an Advanced Air Interface Traffic Indication-Response (AAI TRF IND-RSP) message.

7. The method of claim 5, wherein the second header comprises one of an SCH and an SCEH.

8. The method of claim 5, wherein the one of the response message and the second header comprises a starting frame number of a next-scheduled sleep cycle and a size of the next-scheduled sleep cycle.

9. The method of claim 8, wherein the size of the next-scheduled sleep cycle indicates a length of a sleep cycle which contains a next-scheduled listening window for a case where the sleep cycle is doubled.

10. The method of claim 1, further comprising:
    if the traffic indication message is one of lost and not detected, staying awake during a remaining interval of the listening window.

11. The method of claim 10, further comprising:
    if the unicast data is received during the listening window, assuming that the traffic indicator is 'positive'.

12. The method of claim 1, wherein the transmitting of the on one of the request message and the first header comprises:
    transmitting the one of the request message and the header to the BS to request a starting frame number of a next-scheduled sleep cycle and a size of a previous sleep cycle of the next-scheduled sleep cycle.

13. A method of operating a Base Station (BS) in a wireless communication system, the method comprising:
    receiving one of a request message and a first header from a Mobile Station (MS), which fails to receive a traffic indication message and unicast data during a listening window, to request a location of a next-scheduled listening window; and
    responding to the MS by unicasting one of a response message and a second header which contains a starting frame number of a next-scheduled sleep cycle and a size of the next-scheduled sleep cycle to the MS.

14. The method of claim 13, wherein the request message comprises an Air Interface Traffic Indication-Request (AAI TRF IND-REQ) message.

15. The method of claim 13, wherein the first header received from the MS comprises one of a Sleep Control Header (SCH) and a Sleep Control Extended Header (SCEH).

16. The method of claim 13, wherein the response message comprises an Advanced Air Interface Traffic Indication-Response (AAI TRF IND-RSP) message.

17. The method of claim 13, wherein the second header unicast to the MS comprises one of an SCH and an SCEH.

18. The method of claim 13, wherein the one of the response message and the second header comprises a starting frame number of the next-scheduled sleep cycle and a size of the next-scheduled sleep cycle.

19. The method of claim 18, wherein the size of the next-scheduled sleep cycle indicates a length of a sleep cycle which contains a next-scheduled listening window for a case where the sleep cycle is doubled.

20. A Mobile Station (MS) apparatus in a wireless communication system, the apparatus comprising:
    a modem for transmitting one of a request message and a first header to a Base Station (BS) to request a location of a next-scheduled listening window if a traffic indication message and unicast data are not received during a listening window; and
    a controller for performing synchronization for a next sleep cycle upon receiving a response for the one of the request message and the header.

21. The apparatus of claim 20, wherein the modem transmits the one of the request message and the first header to the BS to request a starting frame number of a next-scheduled sleep cycle and a size of the next-scheduled sleep cycle.

22. The apparatus of claim 21, wherein the request message comprises an Air Interface Traffic Indication-Request (AAI TRF IND-REQ) message.

23. The apparatus of claim 21, wherein the first header comprises one of a Sleep Control Header (SCH) and a Sleep Control Extended Header (SCEH).

24. The apparatus of claim 20, wherein the response comprises one of a response message and a second header.

25. The apparatus of claim 24, wherein the response message comprises an Advanced Air Interface Traffic Indication-Response (AAI TRF IND-RSP) message.

26. The apparatus of claim 24, wherein the second header comprises one of an SCH and an SCEH.

27. The apparatus of claim 24, wherein the one of the response message and the second header comprises a starting frame number of a next-scheduled sleep cycle and a size of the next-scheduled sleep cycle.

28. The apparatus of claim 27, wherein the size of the next-scheduled sleep cycle indicates a length of a sleep cycle which contains a next-scheduled listening window for a case where the sleep cycle is doubled.

29. The apparatus of claim 20, wherein, if the traffic indication message is one of lost and not detected, the controller controls the apparatus to stay awake during a remaining interval of the listening window.

30. The apparatus of claim 29, wherein, if the unicast data is received during the listening window, the controller assumes that the traffic indicator is 'positive'.

31. The apparatus of claim 20, wherein the modem transmits the one of the request message and the first header to the BS to request a starting frame number of a next-scheduled sleep cycle and a size of a previous sleep cycle of the next-scheduled sleep cycle.

32. A Base Station (BS) apparatus in a wireless communication system, the apparatus comprising:
a modem for receiving one of a request message and a first header from a Mobile Station (MS), which fails to receive a traffic indication message and unicast data during a listening window, the request message requesting a location of a next-scheduled listening window; and
a controller for responding to the MS by unicasting one of a response message and a second header which contains a starting frame number of a next-scheduled sleep cycle and a size of the next-scheduled sleep cycle to the MS.

33. The apparatus of claim 32, wherein the request message comprises an Air Interface Traffic Indication-Request (AAI TRF IND-REQ) message.

34. The apparatus of claim 32, wherein the first header received from the MS comprises one of a Sleep Control Header (SCH) and a Sleep Control Extended Header (SCEH).

35. The apparatus of claim 32, wherein the response message comprises an Advanced Air Interface Traffic Indication-Response (AAI TRF IND-RSP) message.

36. The apparatus of claim 32, wherein the second header unicast to the MS comprises one of an SCH and an SCEH.

37. The apparatus of claim 32, wherein the one of the response message and the second header comprises a starting frame number of the next-scheduled sleep cycle and a size of the next-scheduled sleep cycle.

38. The apparatus of claim 37, wherein the size of the next-scheduled sleep cycle indicates a length of a sleep cycle which contains a next-scheduled listening window for a case where the sleep cycle is doubled.

* * * * *